United States Patent
Kato

(10) Patent No.: US 10,586,143 B2
(45) Date of Patent: Mar. 10, 2020

(54) METAL CAP WITH RFID TAG AND CONTAINER COMPRISING SAME

(71) Applicant: Murata Manufacturing Co., Ltd., Nagaokakyo-shi, Kyoto-fu (JP)

(72) Inventor: Noboru Kato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/297,949

(22) Filed: Mar. 11, 2019

(65) Prior Publication Data

US 2019/0205715 A1 Jul. 4, 2019

Related U.S. Application Data

(63) Continuation of application No. PCT/JP2017/034124, filed on Sep. 21, 2017.

(30) Foreign Application Priority Data

Sep. 26, 2016 (JP) .................. 2016-187183
Nov. 14, 2016 (JP) .................. 2016-221854

(51) Int. Cl.
*G06K 19/077* (2006.01)
*B65D 41/62* (2006.01)
(Continued)

(52) U.S. Cl.
CPC ......... *G06K 19/0775* (2013.01); *B65D 41/62* (2013.01); *B65D 51/20* (2013.01); *B65D 51/24* (2013.01); *G06K 19/0723* (2013.01); *G06K 19/07726* (2013.01); *G06K 19/07777* (2013.01); *G06K 19/07788* (2013.01); *G06K 19/07798* (2013.01); *H01Q 1/2225* (2013.01); *H01Q 1/38* (2013.01); *H01Q 7/00* (2013.01);
(Continued)

(58) Field of Classification Search
None
See application file for complete search history.

(56) References Cited

U.S. PATENT DOCUMENTS 7,342,501 B2   3/2008   Abbott
8,070,070 B2  12/2011   Taniguchi et al.
(Continued)

FOREIGN PATENT DOCUMENTS

JP   2009525930 A   7/2009
WO  2009081683 A1   7/2009

OTHER PUBLICATIONS

International Search Report issued in PCT/JP2017/034124, dated Nov. 7, 2017.
(Continued)

*Primary Examiner* — Kristy A Haupt
(74) *Attorney, Agent, or Firm* — Arent Fox LLP

(57) ABSTRACT

A metal cap is provided with an RFID tag that includes a metal cap including a cylindrical main body part, a top plate part formed at one end of the cylindrical main body part, and an opening part formed at the other end of the cylindrical main body part, and an RFID tag disposed on the metal cap. The RFID tag includes an RFIC element disposed in the metal cap, and a loop antenna connected to the RFIC element. At least a portion of a loop opening of the loop antenna extends in a circumferential direction R of the metal cap while being exposed from an opening edge of the opening part of the metal cap to the outside of the metal cap.

20 Claims, 19 Drawing Sheets

(51) Int. Cl.
    *H01Q 1/22*      (2006.01)
    *H01Q 7/00*      (2006.01)
    *H01Q 1/38*      (2006.01)
    *G06K 19/07*     (2006.01)
    *H01Q 21/28*     (2006.01)
    *B65D 51/20*     (2006.01)
    *B65D 51/24*     (2006.01)

(52) U.S. Cl.
    CPC ......... *H01Q 21/28* (2013.01); *B65D 2203/10* (2013.01); *G06K 19/07794* (2013.01)

(56) References Cited

U.S. PATENT DOCUMENTS

| | | |
|---|---|---|
| 2007/0182563 A1 | 8/2007 | Abbott |
| 2009/0166434 A1 | 7/2009 | Taniguchi et al. |
| 2011/0155810 A1 | 6/2011 | Taniguchi et al. |
| 2012/0235871 A1 | 9/2012 | Taniguchi et al. |
| 2015/0307245 A1 | 10/2015 | Puccini |

OTHER PUBLICATIONS

Written Opinion of the International Searching Authority issued in PCT/JP2017/034124, dated Nov. 7, 2017.

# METAL CAP WITH RFID TAG AND CONTAINER COMPRISING SAME

CROSS REFERENCE TO RELATED APPLICATIONS

The present application is a continuation of PCT/JP2017/034124 filed Sep. 21, 2017, which claims priority to Japanese Patent Application No. 2016-187183, filed Sep. 26, 2016, and Japanese Patent Application No. 2016-221854, filed Nov. 14, 2016, the entire contents of each of which are incorporated herein by reference.

TECHNICAL FIELD

The present disclosure relates to a metal cap comprising an RFID tag and a container having an opening covered with the metal cap.

BACKGROUND

To prevent unauthorized opening of a container and counterfeiting of contents thereof, RFID (Radio Frequency Identification Device) tags are conventionally disposed on a cap covering an opening of the container.

For example, the cap described in Patent Document 1 (identified below) is made of a plastic material and has an RFID tag disposed on the back side of a top plate part thereof.

Patent Document 1: Japanese Unexamined Patent Application Publication (Translation of PCT Application) No. 2009-525930.

If a cap is made of a non-metal material such as a plastic material as is the cap described in Patent Document 1, the RFID tag provided inside the cap can communicate with a communication device outside the cap. However, If the cap is made of a metal material and the RFID tag is disposed inside the metal cap, the RFID tag cannot communicate with a communication device outside the cap.

If an RFID tag is provided outside the metal cap as a countermeasure, the RFID tag can easily be removed, which may make it unable to prevent unauthorized opening of a container and counterfeiting of contents thereof.

SUMMARY OF THE INVENTION

It is therefore an object of the present invention to provide an RFID tag inside a metal cap in a manner allowing communication with a communication device outside a metal cap.

Accordingly, to solve the technical problem of conventional systems, an aspect of the present invention provides a metal cap that include a metal cap including a cylindrical main body, a top plate part formed at one end of the cylindrical main body, and an opening formed at the other end of the cylindrical main body part. Moreover; an RFID tag is disposed on the metal cap and includes an RFIC element disposed in the metal cap, and a loop antenna connected to the RFIC element.

Furthermore, at least a portion of a loop opening of the loop antenna extends in a circumferential direction of the metal cap while being exposed from an opening edge of the opening part of the metal cap to the outside of the metal cap.

Another exemplary aspect of the present invention, a container is provided that includes an opening and further comprises a metal cap including a cylindrical main body, a top plate formed at one end of the cylindrical main body, and an opening formed at the other end of the cylindrical main body part. The metal cap covers the opening of the container; and an RFID tag is disposed on the metal cap, wherein the RFID tag includes an RFIC element disposed in the metal cap, and a loop antenna connected to the RFIC element, and wherein at least a portion of a loop opening of the loop antenna extends in a circumferential direction of the metal cap while being exposed from an opening edge of the opening part of the metal cap to the outside of the metal cap.

According to the present invention, even when provided inside the metal cap, the RFID tag can communication with a communication device outside the metal cap.

DETAILED DESCRIPTION

Figure 1:
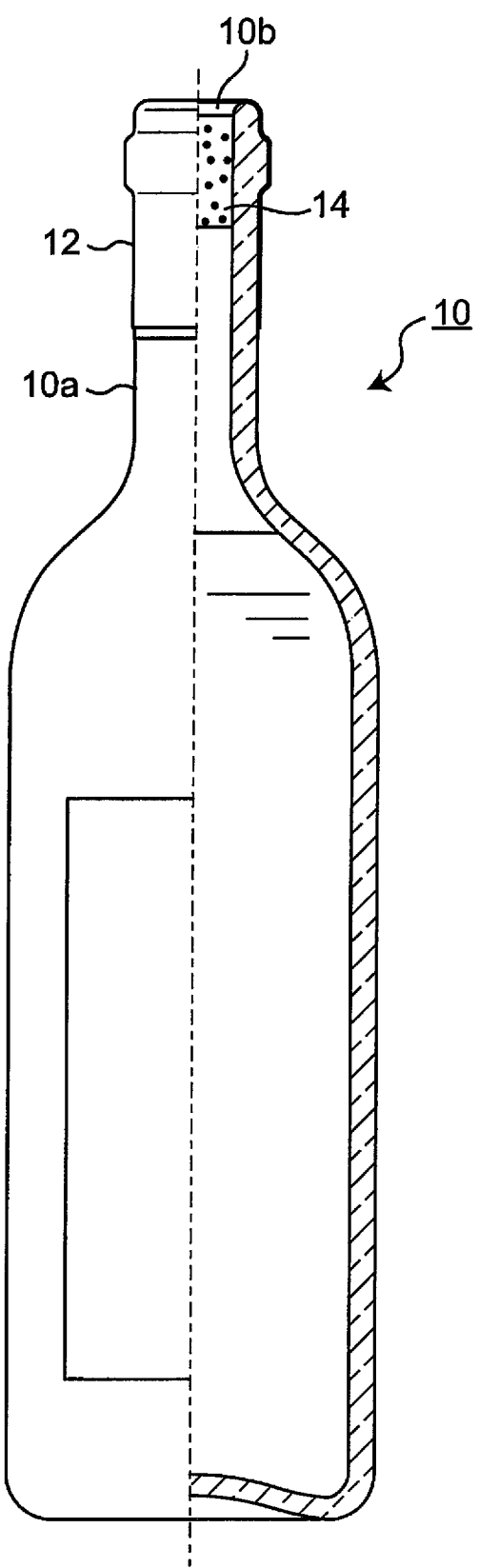
FIG. 1 is a partial cross-sectional view of a container according to an exemplary embodiment.

A metal cap with an RFID tag according to an exemplary aspect comprises a metal cap that includes a cylindrical main body, a top plate disposed at one end (i.e., a first end) of the cylindrical main body, and an opening formed at the other end (i.e., a second end opposite the first end) of the cylindrical main body. Moreover, an RFID tag is disposed on the metal cap and includes an RFIC element disposed in the metal cap, and a loop antenna connected to the RFIC element. At least a portion of a loop opening of the loop antenna extends in a circumferential direction of the metal cap while being exposed from an opening edge of the opening part of the metal cap to the outside of the metal cap.

According to this aspect, even when provided inside the metal cap, the RFID tag can communication with a communication device outside the metal cap.

In an exemplary aspect, the loop antenna can include a first conductor extending in the circumferential direction and entirely located outside the metal cap, and a second conductor extending in the circumferential direction to face the first conductor across the loop opening and at least partially overlapping with the cylindrical main body part of the metal cap.

Moreover, the second conductor preferably has a width larger than the width of the first conductor. This allows the second conductor to reliably overlap with the cylindrical main body part of the metal cap, and the metal cap can function as a booster enhancing a magnetic field generated by the loop antenna.

The loop antenna can include a first loop antenna including a first loop opening and a second loop antenna including a second loop opening facing the first loop opening. Moreover, the first loop antenna and the second loop antenna can be connected in series so that a current flows in the same direction as viewed in a facing direction of the first and second loop openings. As a result, a magnetic field spreading over a wider range can be formed, and consequently, the communicable range further spreads.

In an exemplary aspect, the RFIC element and the loop antenna can be connected via a magnetic shield type inductor chip including an inductor covered with a magnetic material. As a result, the RFID tag can acquire a desired resonance frequency. Additionally, since the inductor chip is a magnetic shield type inductor chip, the resonance frequency of the RFID tag is restrained from changing due to a magnetic field generated by a current flowing through the metal cap due to a magnetic field from the inductor of the inductor chip.

A container according to another exemplary aspect of the present invention is a container that includes an opening, comprising: a metal cap including a cylindrical main body, a top plate formed at one end of the cylindrical main body, and an opening formed at the other end of the cylindrical main body. In addition, the metal cap covers the opening of the container; and an RFID tag is disposed on the metal cap, wherein the RFID tag includes an RFIC element disposed in the metal cap, and a loop antenna connected to the RFIC element, and wherein a loop opening of the loop antenna extends in a circumferential direction of the metal cap while being at least partially exposed through the opening part of the metal cap to the outside of the metal cap.

According to this aspect, even when provided inside the metal cap, the RFID tag can communication with a communication device outside the metal cap. As a result, unauthorized opening of the container and counterfeiting of contents thereof can be prevented.

In one exemplary aspect, the container can be a wine bottle, and the metal cap may be a cap seal.

Exemplary embodiment of the present invention will now be described with reference to the drawings.

FIG. 1 is a partial cross-sectional view of a container according to an exemplary embodiment. In the case of this embodiment, the container 10 can be a wine bottle (glass bottle) storing wine and comprises a metal cap 12.

In this embodiment, still wine is stored in the container 10, and a spout (opening) 10b formed at a tip of a neck part 10a of the container 10 is closed by a cork stopper 14. A metal cap 12 is fitted to the neck part 10a of the container 10 to cover the spout 10b. The metal cap 12 as in this embodiment is referred to as a cap seal or a foil seal.

Figure 2:
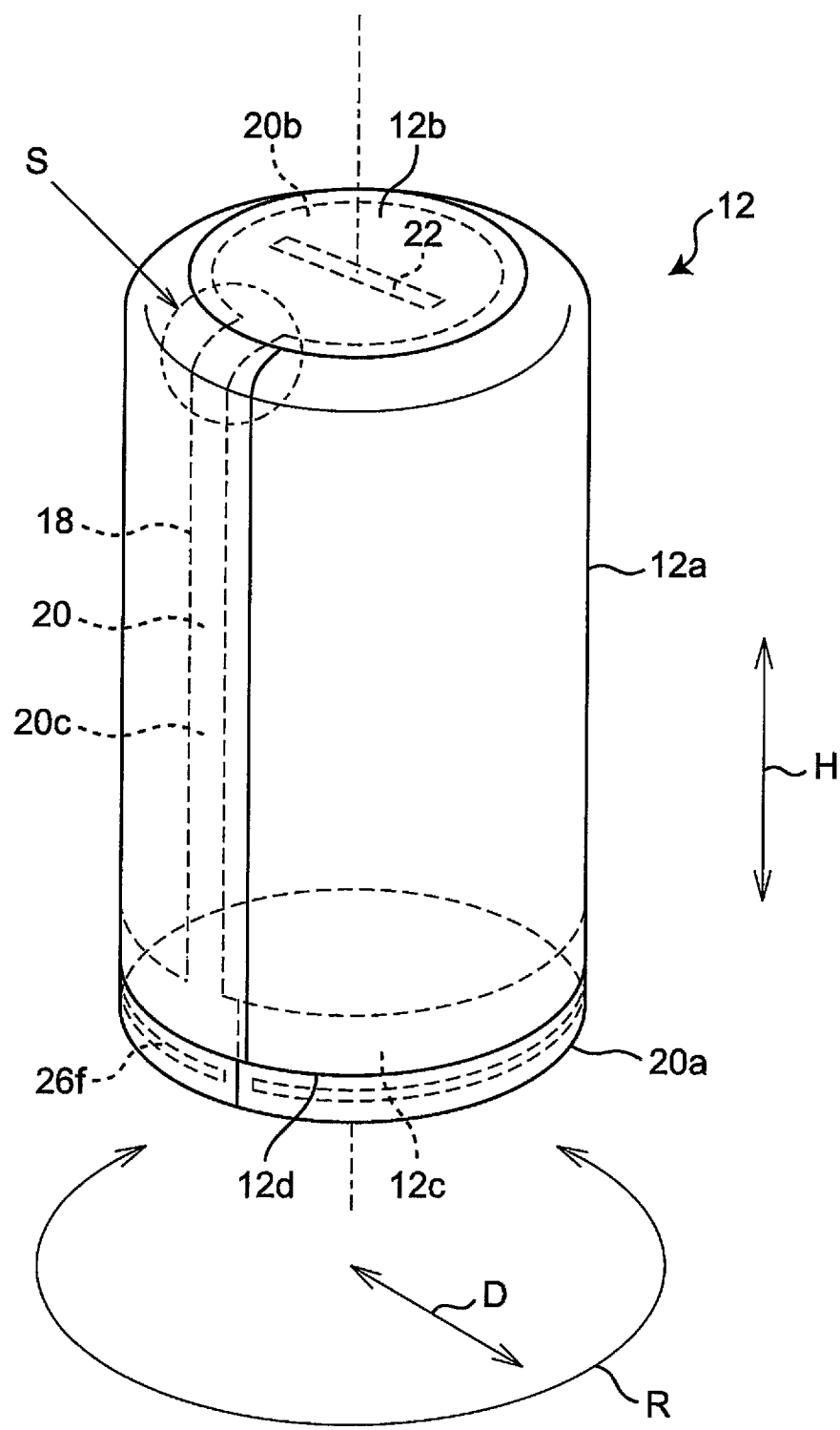
FIG. 2 is a perspective view of a metal cap according to the exemplary embodiment.

FIG. 2 is a perspective view of the metal cap 12. As shown in FIG. 2, the metal cap 12 has a bottomed cylindrical shape and includes a cylindrical main body part 12a (i.e., a main body), a top plate part 12b (i.e., a top plate) formed at one end ("first end") of the cylindrical main body part 12a, and an opening part 12c (i.e., an opening) formed at the other end ("second end") of the cylindrical main body part 12a. In FIG. 2, a direction H indicates a height direction of the metal cap 12, a direction D indicates a radial direction, and a direction R indicates a circumferential direction.

Figure 3:
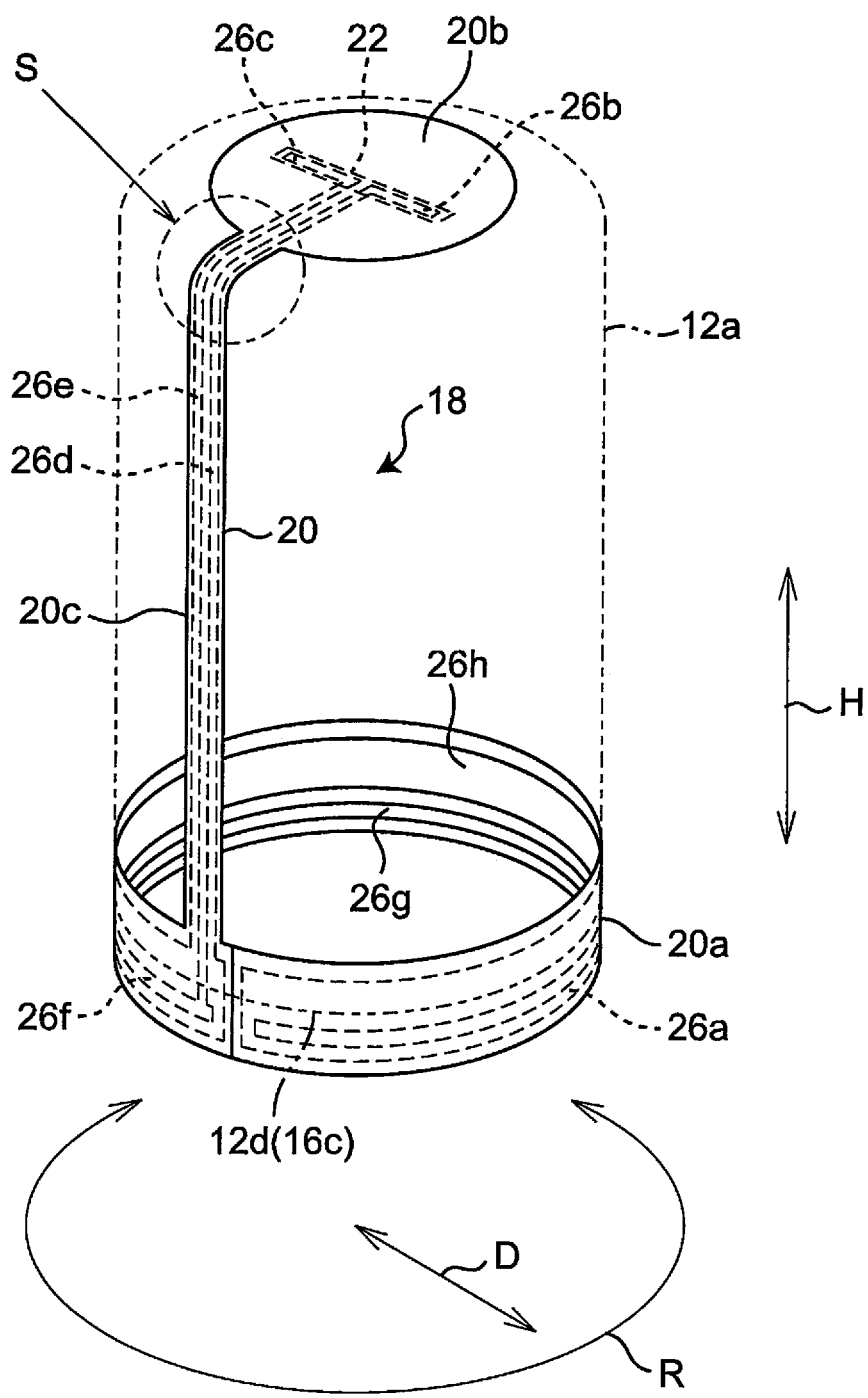
FIG. 3 is a perspective view showing the inside of the metal cap.

FIG. 3 shows the inside of the metal cap 12. As shown in FIG. 3, an RFID (Radio Frequency Identification Device) tag 18 is provided inside the metal cap 12.

The RFID tag 18 is provided inside the metal cap 12 covering the spout 10b of the container 10 so as to prevent unauthorized opening of the container 10 and counterfeiting of contents thereof (e.g., wine in the case of this embodiment). The RFID tag 18 is configured to communicate with a communication device (e.g., an RFID tag reader/writer) outside the metal cap 12 even when disposed inside the metal cap 12. The configuration of the RFID tag 18 will be described in detail below.

As shown in FIG. 3, the RFID tag 18 includes an antenna member 20 and a power feeding module 22.

As shown in FIG. 2, the antenna member 20 includes a cylindrical base part 20a disposed in the cylindrical main body part 12a of the metal cap 12 such that a portion thereof is exposed to the outside, a power feeding module support part 20b disposed on the back side of the top plate part 12b of the metal cap 12 for attaching the power feeding module 22, and a coupling part 20c coupling the base part 20a and the module support part 20b.

A three-dimensional shape of the RFID tag 18 as shown in FIG. 3 is formed in a process of fabricating the metal cap 12. The process of fabricating the metal cap 12 will be described.

Figure 4:
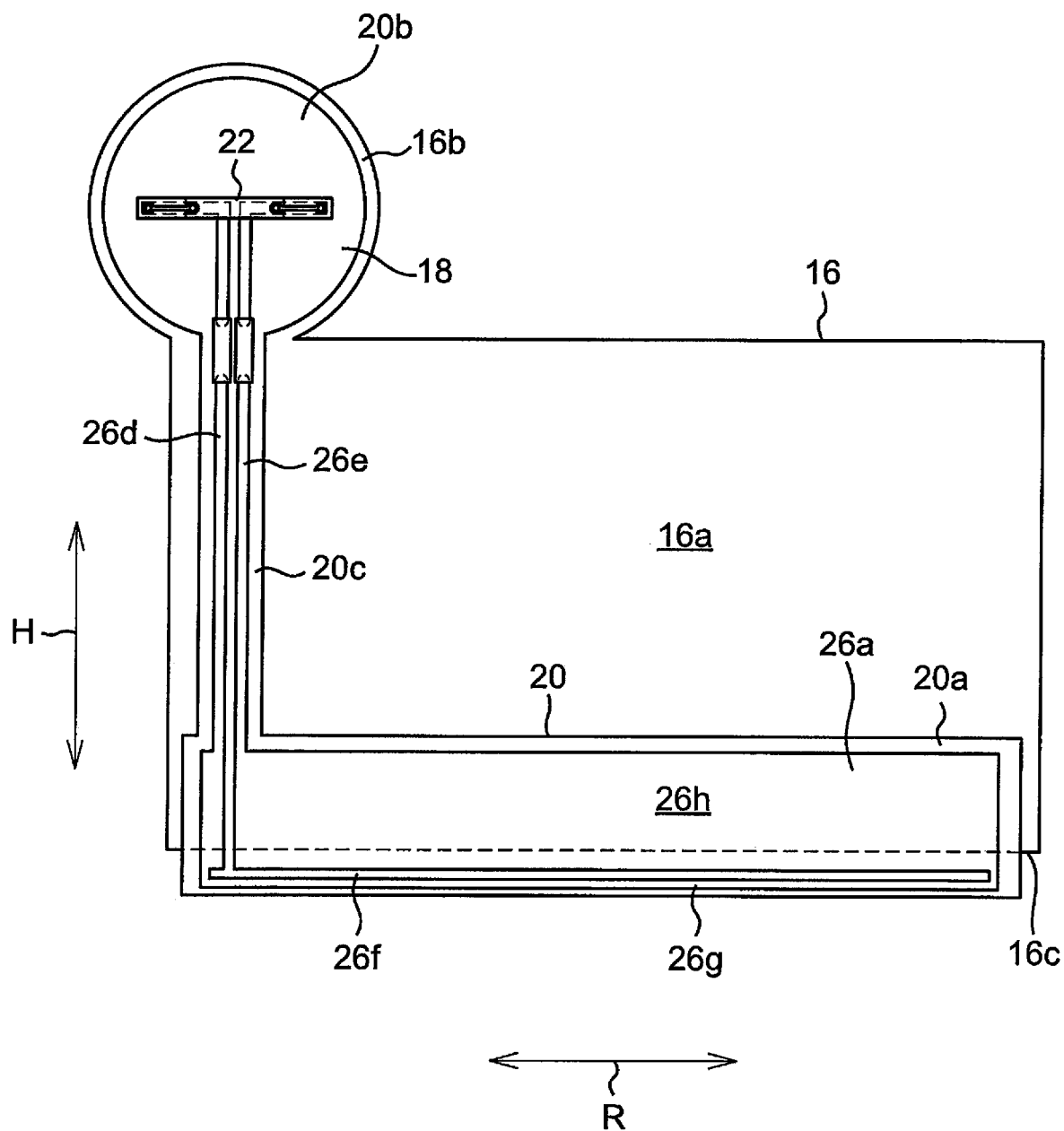
FIG. 4 is a development view of the metal cap.

FIG. 4 is a development view of the metal cap 12. Therefore, FIG. 4 shows a sheet-shaped material of the metal cap 12 before processing into a cap shape. As shown in FIG. 4, the metal cap 12 is made from a plastic-coated metal sheet 16 of aluminum, tin, or the like. The metal sheet 16 includes a rectangular-shaped part 16a processed into a cylindrical shape as the cylindrical main body part 12a of the metal cap 12 and a circular-shaped part 16b processed into the top plate part 12b of the metal cap 12.

The metal cap 12 shown in FIG. 2 fabricated from the metal sheet 16 shown in FIG. 4 is fitted to the neck part 10a of the container 10 such that a back side surface of the top plate part 12b faces the spout 10b of the container 10 and is then deformed along the external shape of the neck part 10a, i.e., such that the metal cap 12 is brought into close contact with the neck part 10a. For example, while the top plate part 12b of the metal cap 12 is pressed against the neck part 10a, the cylindrical main body part 12a of the metal cap 12 is twisted to bring the metal cap 12 into close contact with the neck part 10a so that the spout 10b is sealed.

In this embodiment, as shown in FIG. 4, the RFID tag 18 is fabricated in a form of a sheet and is affixed to one surface of the metal sheet 16 (the surface serving as an inside surface of the metal cap 12). Specifically, the base part 20a and the coupling part 20c are affixed to the rectangular-shaped part 16a of the metal sheet 16, and the power feeding module support part 20b is affixed to the circular-shaped part 16b.

By processing the metal sheet 16 to which the sheet-shaped RFID tag 18 is attached as described above into the metal cap 12, as shown in FIG. 2, the base part 20a of the antenna member 20 is formed into a cylindrical shape and disposed in the cylindrical main body part 12a of the metal cap 12. The power feeding module support part 20b and the coupling part 20c of the antenna member 20 are also disposed inside the metal cap 12.

As shown in FIG. 2, a portion of the base part 20a of the antenna member 20 protrudes (or extends) from an opening edge 12d of the opening part 12c of the metal cap 12 to the outside of the metal cap 12. Therefore, as shown in FIG. 4, the base part 20a is affixed to the rectangular-shaped part 16a such that a portion thereof protrudes from an end 16c of the rectangular-shaped part 16a of the metal sheet 16 (the end subsequently serving as the opening edge 12d), the advantages of which will be described below.

Figure 5:
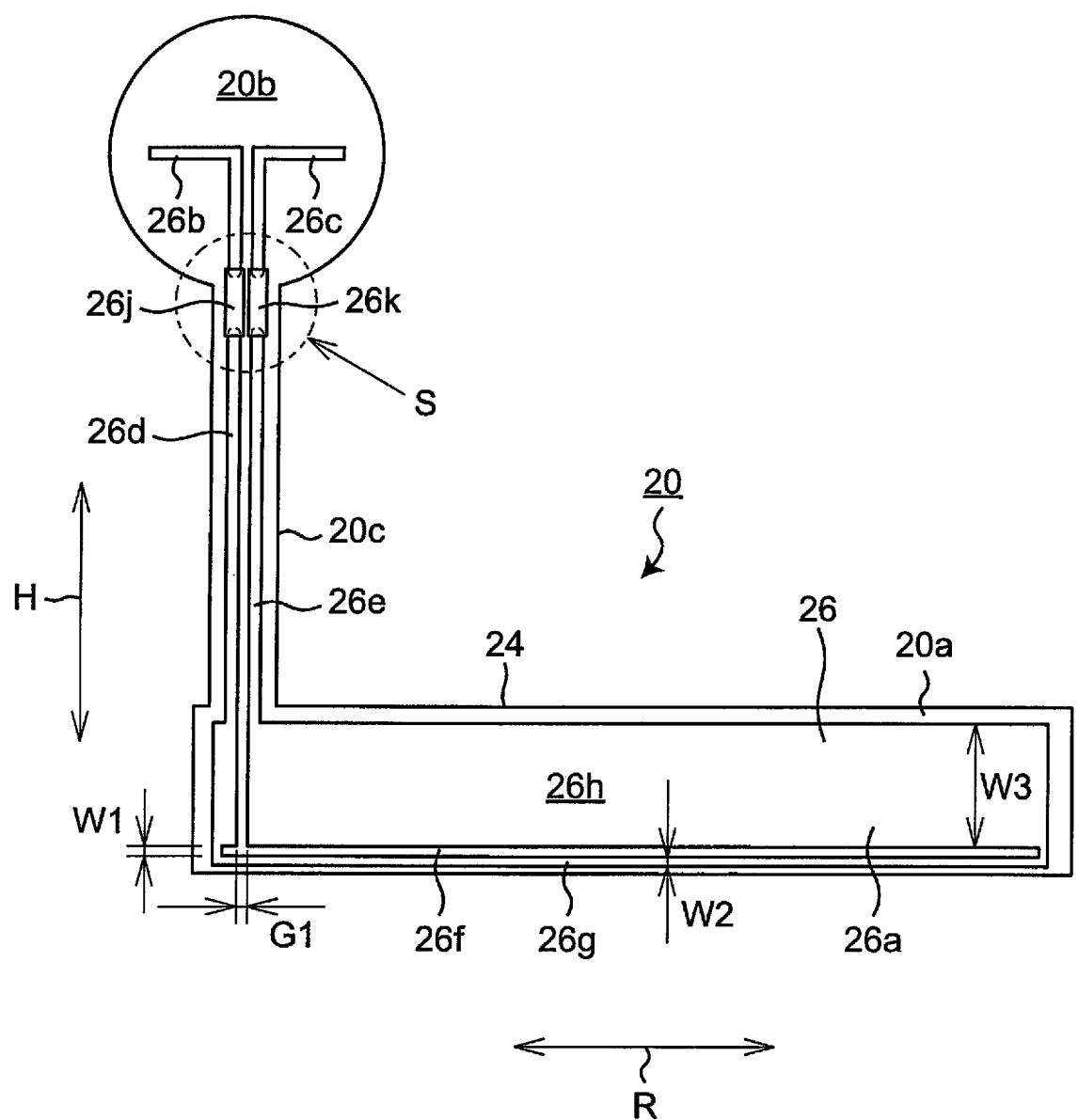
FIG. 5 is a view showing a seat-state antenna member of an RFID tag.

Further details of the antenna member 20 of the RFID tag 18 will be described with reference to FIG. 5 showing the antenna member 20 in a sheet form.

As shown in FIG. 5, the antenna member 20 is made up of an antenna pattern 26 formed on or inside a base film 24.

As shown in FIG. 5, the base film 24 is a flexible film made of an insulating material that is a plastic material such as PET, a paper material, or the like.

The antenna pattern 26 is a conductor pattern formed on the base film 24 by using a conducting material such as aluminum and copper. In the exemplary aspect, the antenna pattern is also flexible. The antenna pattern 26 includes a loop antenna part 26a for transmitting/receiving signals, connection terminal parts 26b, 26c for connecting to the power feeding module 22, a wiring part 26d connecting one end of the loop antenna part 26a and the connection terminal part 26b, and a wiring part 26e connecting the other end of the loop antenna part 26a and the connection terminal part 26c.

The loop antenna part 26a of the antenna pattern 26 is disposed on the base part 20a of the antenna member 20. The loop antenna part 26a also includes a loop opening 26f having a rectangular shape and extending in the circumferential direction R of the metal cap 12. The loop opening 26f is a portion of the loop antenna part 26a and interposed between a first conductor part 26g extending in the circumferential direction R and a second conductor part 26h extending in the circumferential direction R at an interval from the first conductor part 26g. In the case of this embodiment, the first conductor part 26g and the second conductor part 26h are substantially parallel.

As shown in FIG. 2, the loop opening 26f of the loop antenna part 26a of the antenna pattern 26 is at least partially located outside the metal cap 12. In the case of this embodiment, as shown in FIG. 4, the base film 24 of the antenna member 20 is affixed to the metal sheet 16 so that the entire loop opening 26f does not overlap with the metal sheet 16.

Specifically, as shown in FIG. 4, in the case of this embodiment, since the entire loop opening 26f is disposed outside the metal cap 12, the first conductor part 26g does not overlap with the rectangular-shaped part 16a of the metal sheet 16. As a result, the entire first conductor part 26g is disposed outside the metal cap 12.

On the other hand, the second conductor part 26h partially overlaps with the rectangular-shaped part 16a of the metal sheet 16 as described in detail below. As a result, the second conductor part 26h partially overlaps with the cylindrical main body part 12a of the metal cap 12.

In this embodiment, as shown in FIG. 5, a width W3 of the second conductor part 26h (dimension in the height direction H of the metal cap 12) is larger than a width W2 of the first conductor part 26g. For example, the width W2 of the first conductor part 26g is 0.5 mm, for example, and the width W3 of the second conductor part 26h is 2.5 mm, for example. As a result, even if variations occur in accuracy of affixing of the antenna member 20 (the base film 24) to the metal sheet 16, a portion of the second conductor part 26h reliably overlaps with the metal sheet 16. A width W1 of the loop opening 26f is 1 mm, for example.

As described above, the loop opening 26f is at least partially exposed to the outside of the metal cap 12 as shown in FIG. 2, so that the loop antenna part 26a can exchange signals with an external communication device (e.g., a reader/writer for an RFID tag).

As shown in FIG. 5, the connection terminal parts 26b, 26c of the antenna pattern 26 are disposed on the power feeding module support part 20b of the antenna member 20.

As shown in FIG. 5, the wiring parts 26d, 26e of the antenna pattern 26 are disposed on the coupling part 20c of the antenna member 20. The wiring parts 26d, 26e extend parallel to each other from the loop antenna part 26a toward the connection terminal parts 26b, 26c.

As shown in FIG. 3, the wiring parts 26d, 26e are bent by approximately 90 degrees, for example, at a transition part S between the coupling part 20c and the power feeding module support part 20b of the antenna member 20. Therefore, to suppress breaking due to bending, as shown in FIG. 5, the portions 26j, 26k of the wiring parts 26d, 26e bent by 90 degrees are preferably made of, for example, silver (Ag) paste having a high stretching property as compared to other portions. In an exemplary aspect, the entire antenna pattern 26 may be made of silver paste.

Figure 6:
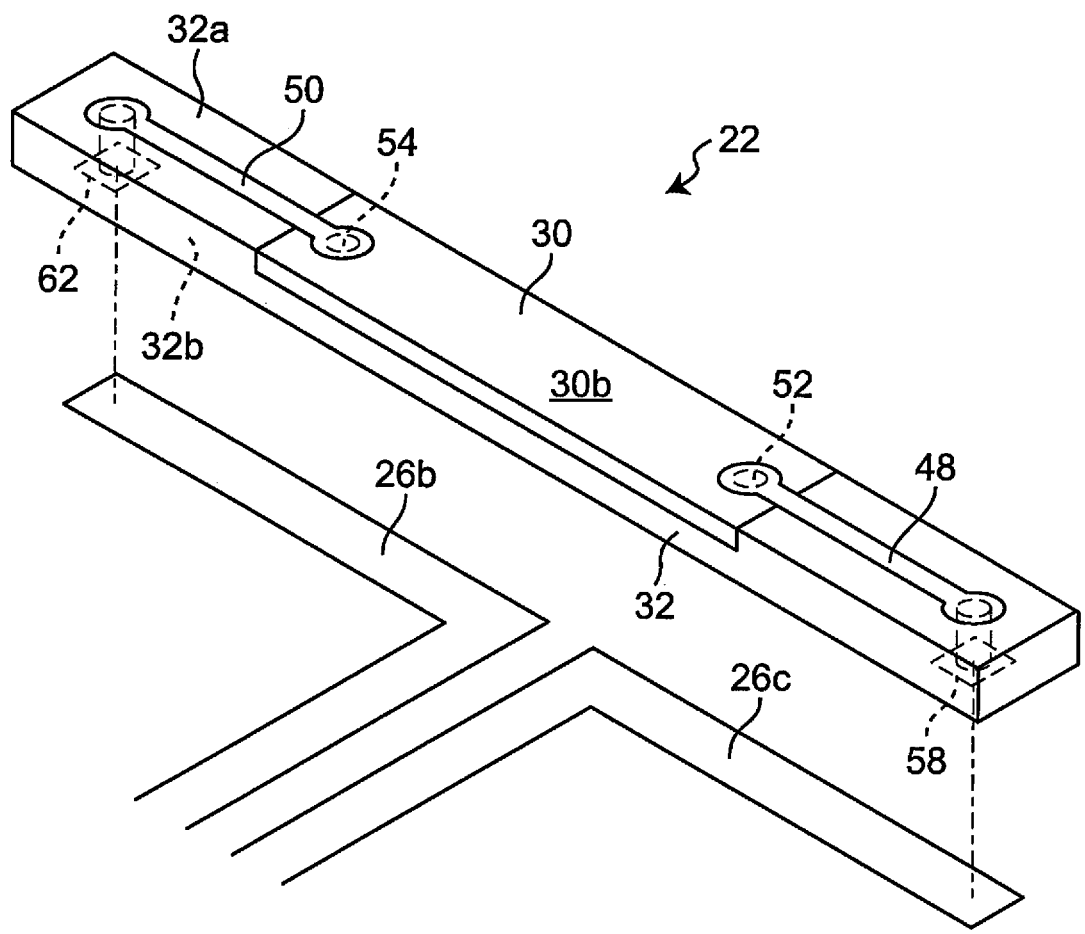
FIG. 6 is a perspective view showing a power feeding module of the RFID tag.
Figure 7:
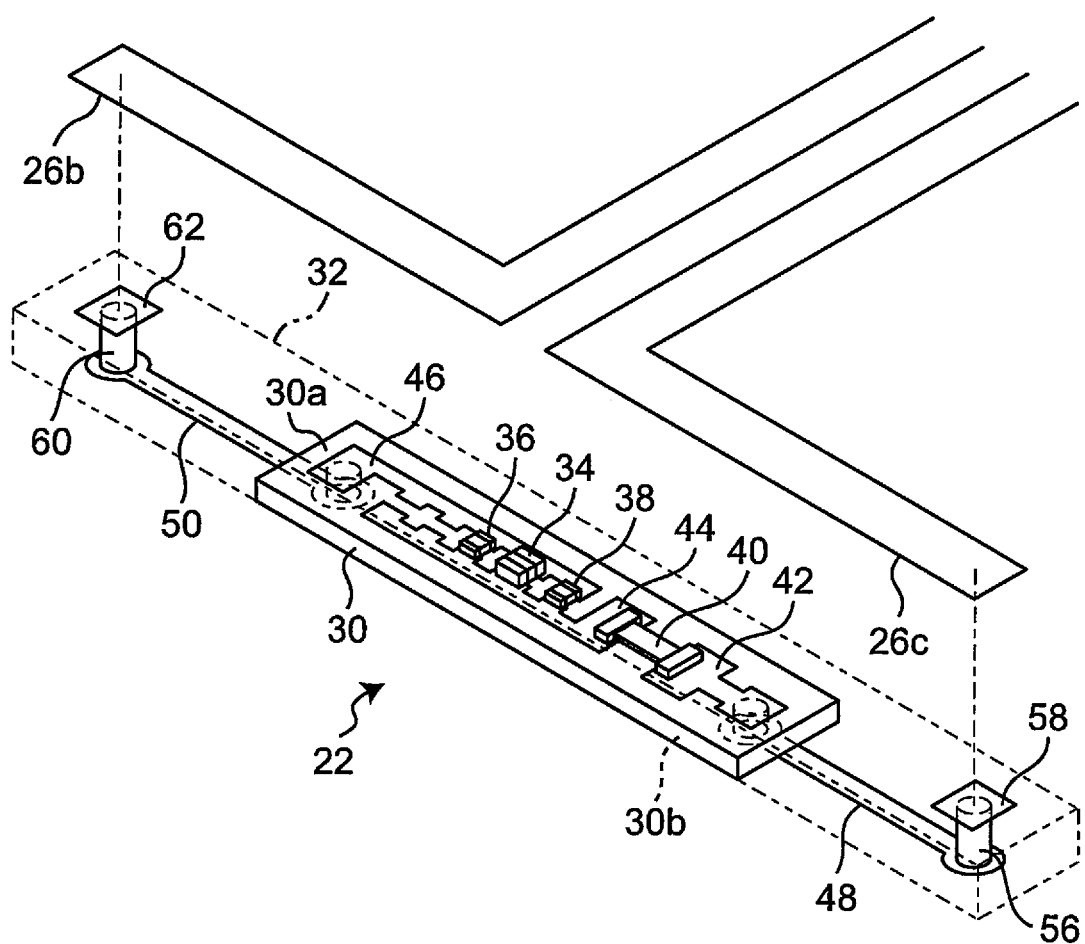
FIG. 7 is a perspective view showing an internal structure of the power feeding module of the RFID tag.
Figure 8:
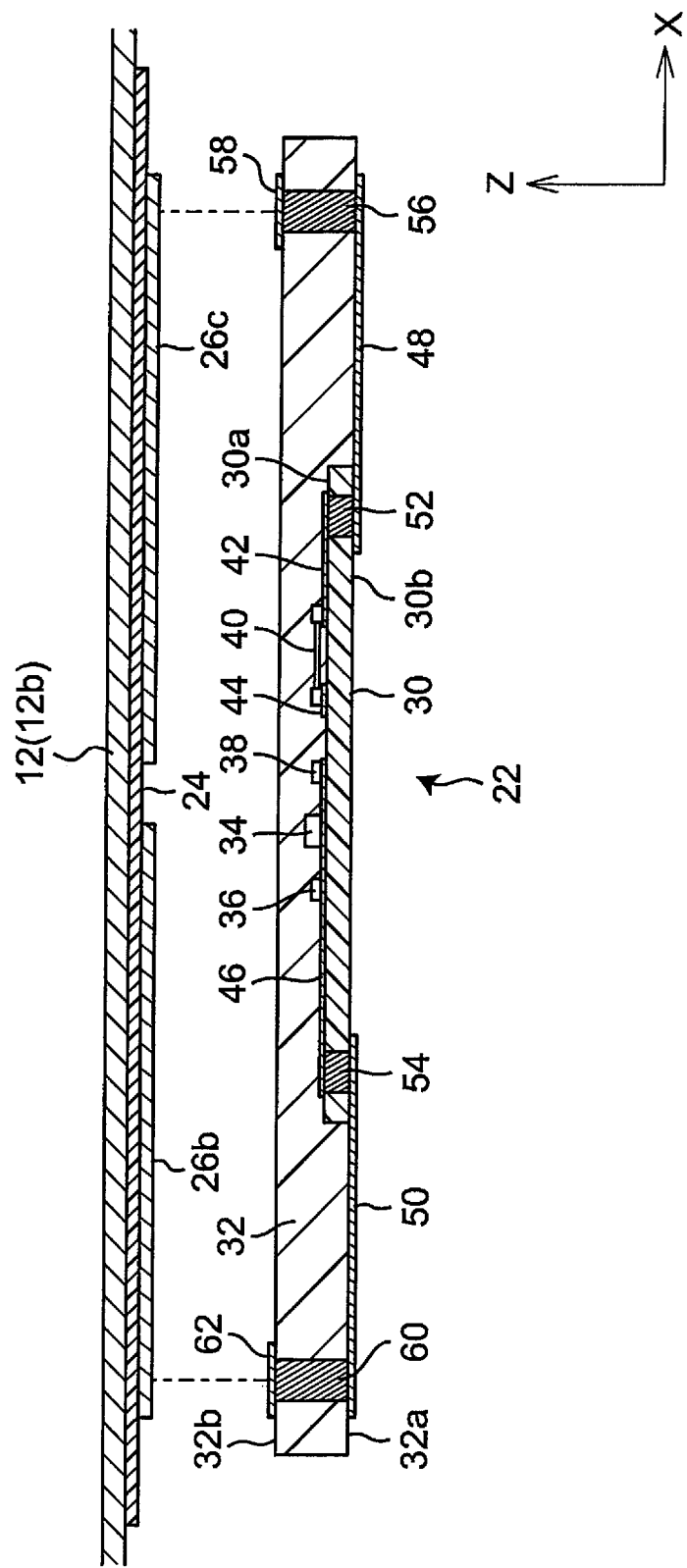
FIG. 8 is a cross-sectional view showing the internal structure of the power feeding module of the RFID tag.
Figure 9:
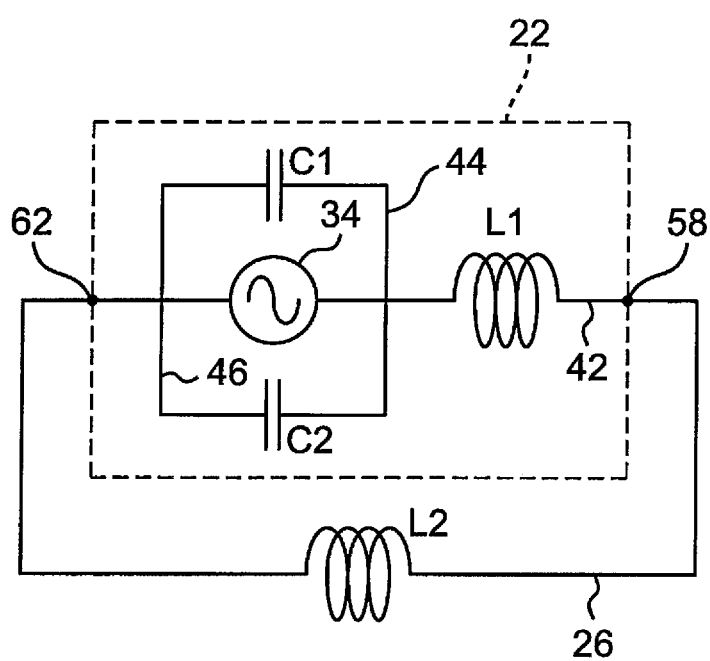
FIG. 9 is a circuit diagram of the RFID tag.

FIG. 6 shows the power feeding module 22 attached to the antenna member 20. FIG. 7 is a perspective view showing an internal structure of the power feeding module 22, and FIG. 8 is a cross-sectional view showing an internal structure of the power feeding module 22. FIG. 9 is a circuit diagram of the RFID tag 18. In FIGS. 6 to 8, an X-axis direction, a Y-axis direction, and a Z-axis direction indicate a longitudinal direction, a width direction, and a thickness direction, respectively, of the power feeding module 22. The height direction H of the metal cap 12 and the Z-axis direction are the same direction.

The power feeding module 22 has a printed wiring board 30 on which a circuit is formed and a resin block 32 holding the printed wiring board 30.

As shown in FIG. 7, the printed wiring board 30 is a rigid board of an epoxy resin or the like and has a principal surface 30a on which an RF (Radio Frequency) IC element 34, capacitor chips 36, 38, an inductor chip 40 are mounted. Conductor patterns 42, 44, 46 electrically connecting the RFIC element 34, the capacitor chips 36, 38, and the inductor chip 40 are formed on the printed wiring board 30. These parts form a parallel circuit of inductors and capacitors, i.e., a resonance circuit, shown in FIG. 9. Specifically, an inductor L1, an inductor L2, a capacitor C1, and a capacitor C2 in the circuit diagram shown in FIG. 9 correspond to the inductor chip 40, the antenna pattern 26, the capacitor chip 36, and the capacitor chip 38, respectively. Therefore, the RFIC element 34 can exchange communication with an external communication device (e.g., a reader/writer for an RFID tag) at a predetermined frequency (resonance frequency) in the HF band, for example. For example, when receiving a signal of a predetermined frequency through the antenna pattern 26 (the loop antenna part 26a thereof), the RFIC element 34 transmits information stored in a storage part such as an internal memory thereof through the antenna pattern 26 to the outside.

As shown in FIGS. 6 and 8, the printed wiring board 30 is disposed in the resin block 32 such that a part thereof is exposed to the outside. Specifically, the printed wiring board 30 is disposed in the resin block 32 such that the principal surface 30a of the printed wiring board 30 is entirely covered while a back surface 30b is exposed.

As shown in FIGS. 6 and 8, conductor patterns 48, 50 extending in the longitudinal direction (X-axis direction) of the power feeding module 22 are formed on one surface 32a of the resin block 32 where the back surface 30b of the printed wiring board 30 is exposed. One end of the conductor pattern 48 is connected to the conductor pattern 42 of the printed wiring board 30 via a conductor 52 penetrating the printed wiring board 30 in the thickness direction (Z-axis direction). One end of the conductor pattern 50 is connected to the conductor pattern 46 of the printed wiring board 30 via a conductor 54 penetrating the printed wiring board 30 in the thickness direction. The conductors 52, 54 are interlayer connection conductors such as via-hole conductors and through-hole conductors, for example.

The other end of the conductor pattern 48 is connected to an external connection terminal 58 formed on the other surface 32b of the resin block 32 via a metal pin 56 penetrating the resin block 32 in the thickness direction (Z-axis direction). The other end of the conductor pattern 50 is connected to the external connection terminal 62 via a metal pin 60 penetrating the resin block 32 in the thickness direction.

The external connection terminal 58 of the power feeding module 22 (the resin block 32) is connected to the connection terminal part 26c of the antenna member 20 (the antenna pattern 26). The external connection terminal 62 is connected to the connection terminal part 26b of the antenna member 20. As a result, the antenna member 20 and the power feeding module 22 are connected to form the RFID tag 18.

According to the RFID tag 18 having such a configuration, even when disposed inside the metal cap 12, the RFID tag 18 can communicate with a communication device, for example, an RFID tag reader/writer, outside the metal cap 12.

For example, the RFID tag 18 receives a signal from the RFID tag reader/writer by the loop antenna part 26a having the loop opening 26f at least partially exposed to the outside of the metal cap 12. When the loop antenna part 26a receives the signal, a current flows through the antenna pattern 26, and the RFIC element 34 of the power feeding module 22 is driven.

After being driven, the RFIC element 34 transmits information data stored in the internal storage part through the loop antenna part 26a to the RFID tag reader/writer. The information transmitted by the RFID tag 18 is information on the contents of the container and, in the case of this embodiment, is information such as the brand, the year of manufacture, the distribution history, and the like, of the wine, which can be used to authenticate the wine as would be appreciated to one skilled in the art.

According to the metal cap 12 having a configuration as described above, a magnetic field for wireless communication is formed around the opening part 12c of the metal cap 12. The magnetic field will be described.

Figure 10:
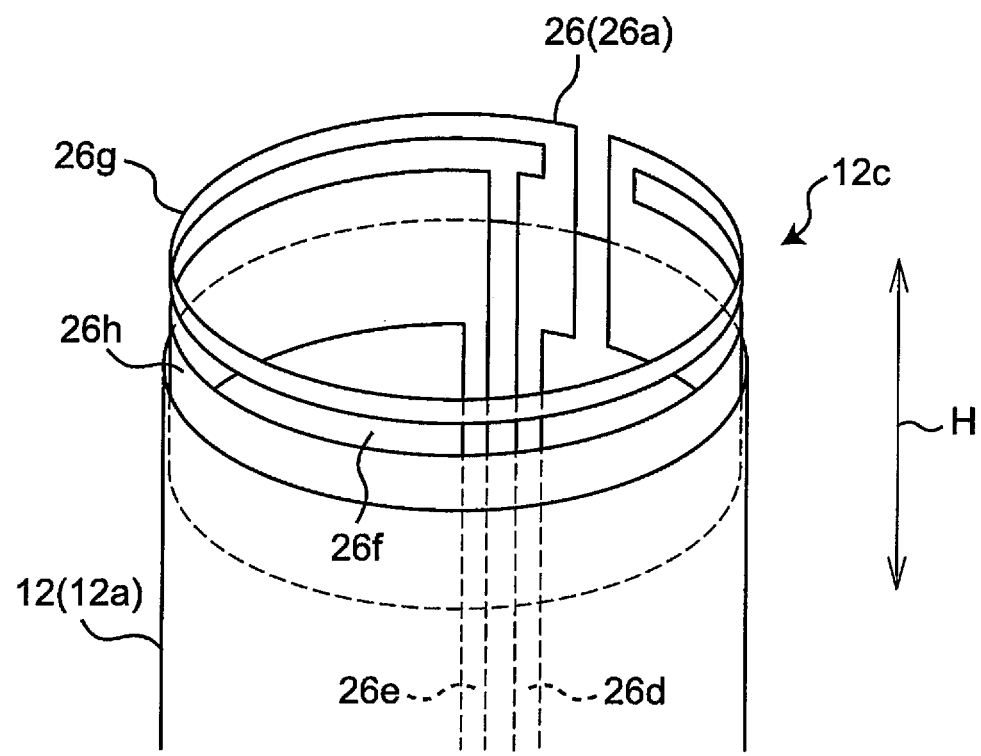
FIG. 10 is a perspective view showing the metal cap and a loop antenna part around an opening part of the metal cap.
Figure 10:
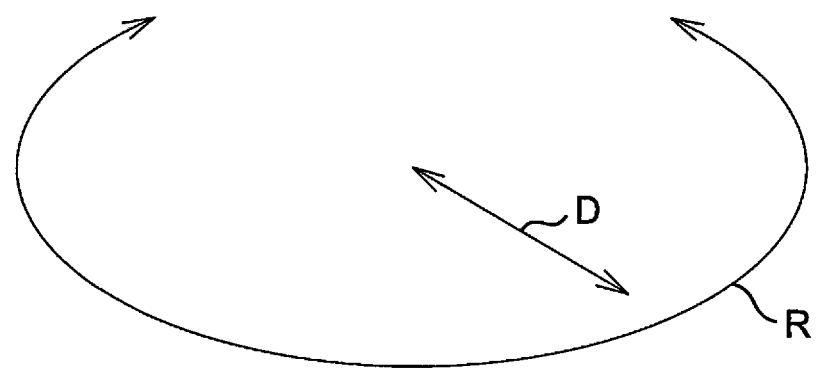

FIG. 10 is a perspective view showing a circumference of the opening part 12c of the metal cap 12, showing a portion of the metal cap 12 and a portion of the antenna pattern 26 of the antenna member 20 of the RFID tag 18. The base film 24 of the antenna member 20 is not shown.

As shown in FIG. 10, the first conductor part 26g in the loop antenna part 26a of the antenna pattern 26 is not present inside the cylindrical main body part 12a of the metal cap 12 and is located entirety outside the metal cap 12. Additionally, the first conductor part 26g extends over substantially the entire circumference of the metal cap 12 in the circumferential direction R of the metal cap 12.

On the other hand, the second conductor part 26h in the loop antenna part 26a of the antenna pattern 26 has a portion located outside the metal cap 12, and the remaining portion is located in the cylindrical main body part 12a of the metal cap 12. Additionally, the second conductor part 26h extends over substantially the entire circumference of the metal cap 12 in the circumferential direction R of the metal cap 12.

Therefore, the loop opening 26f between the first conductor part 26g and the second conductor part 26h in the loop antenna part 26a is not present in the cylindrical main body part 12a of the metal cap 12 and is entirety located outside the metal cap 12. Additionally, the loop opening 26f extends over substantially the entire circumference of the metal cap 12 in the circumferential direction R of the metal cap 12.

Figure 11:
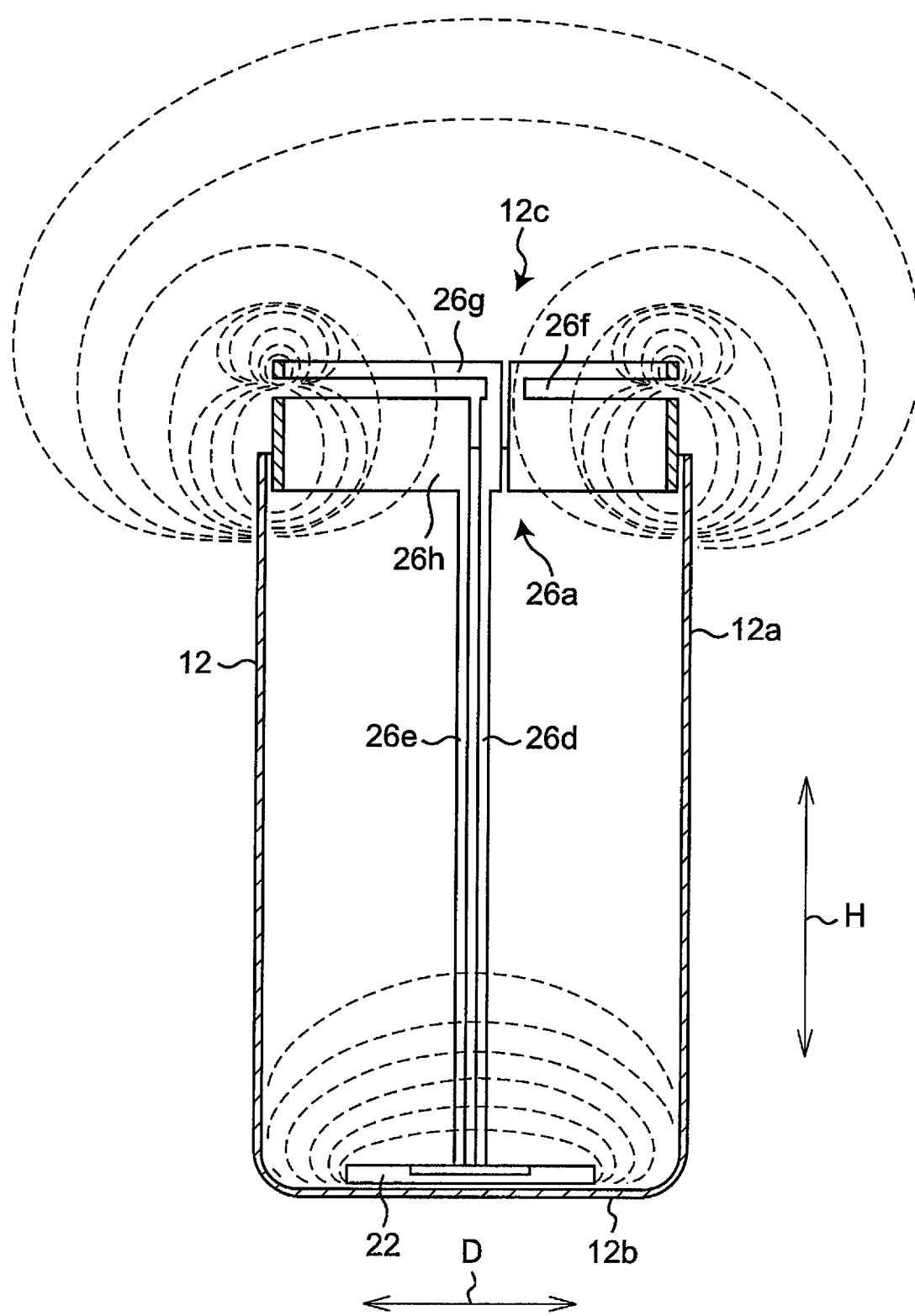
FIG. 11 is a diagram showing a magnetic field distribution generated around the loop antenna part shown in FIG. 10.

FIG. 11 shows a distribution of the magnetic field in the metal cap 12. Dotted lines indicate magnetic force lines.

As shown in FIG. 11, a magnetic field is formed in the first conductor part 26g of the loop antenna part 26a, generating magnetic force lines going around the first conductor part 26g and passing through the loop opening 26f.

On the other hand, unlike the first conductor part 26g, the second conductor part 26h partially overlaps with the cylindrical main body part 12a of the metal cap 12. Therefore, a magnetic field is formed in and near a portion of the cylindrical main body part 12a of the metal cap 12 facing the second conductor part 26h.

Specifically, a portion of the second conductor part 26h and a portion of the cylindrical main body part 12a of the metal cap 12 facing the portion are capacitively coupled via the base film 24 (as well as a plastic coating layer applied to the metal cap 12). The capacitive coupling results in generation of a current flowing in the circumferential direction R with an intensity corresponding to the intensity of the current flowing through the second conductor part 26h in a portion near the opening part 12c in the cylindrical main body part 12a of the metal cap 12. Due to the current, a magnetic field is formed in and near the portion of the cylindrical main body part 12a of the metal cap 12 facing the second conductor part 26h. As a result, as compared to when the metal cap 12 is not included, the loop antenna part 26a generates the magnetic field spreading in every radial direction D of the metal cap 12 and spreading in the height direction H to reach a portion of the cylindrical main body part 12a of the metal cap 12.

In this way, the metal cap 12 functions as a booster enhancing the magnetic field generated by the loop antenna part 26a so to speak. The reason is that the loop opening 26f is present outside the metal cap 12 as shown in FIG. 11. In other words, this is because magnetic force lines are generated from either the outside surface or the inside surface to the other surface of the cylindrical main body part 12a of the metal cap 12 through the loop opening 26f.

As shown in FIG. 11, a magnetic field is also generated around the power feeding module 22 disposed on the back side of the top plate part 12b of the metal cap 12. However, since the magnetic field is far from the opening part 12c of the metal cap 12 and therefore does not reach the outside of the metal cap 12. In other words, the magnetic field around the power feeding module 22 is magnetically shielded by the metal cap 12.

Since the magnetic field is formed around the opening part 12c of the metal cap 12 in this way, even the RFID tag 18 disposed in the metal cap 12 can communicate with the external communication device.

Regarding the communication of the RFID tag 18, the RFID tag 18 is preferably configured such that the communication capability (i.e., the resonance frequency) thereof can stably be maintained.

As described above, for example, as shown in FIG. 2, the power feeding module 22 is disposed in the metal cap 12. In the case of this embodiment, the power feeding module 22 is attached via the base film 24 to the back side of the top plate part 12b.

As a result, as shown in FIG. 8, the inductor chip 40 on the printed wiring board 30 of the power feeding module 22 is disposed in a facing manner in the vicinity of the metal cap 12.

Considering the influence of disposition in the vicinity of the metal cap 12, a magnetic shield type inductor chip restrained from performing magnetic emission to the outside, i.e., having an inductor covered with a magnetic material (magnetically shielded), is preferably used as the inductor chip 40.

The reason for using the magnetic shield type inductor chip will be described. Unlike the above description, if the inductor chip 40 is not a magnetic shield type and therefore performs the magnetic emission to the outside, the resonance frequency of the RFID tag 18 may change and may not be stable.

Specifically, if the inductor chip is not the magnetic shield type, a counter current (eddy current) is generated in a facing portion of the metal cap due to a magnetic field generated from the inductor chip (the inductor thereof). As a result, the Q value of the inductor chip decreases as compared to when the inductor chip is disposed without facing the metal cap, and the resonance frequency of the RFID tag changes. Moreover, if this counter current increases, the inductance value of the inductor chip decreases. Since the counter current varies depending on a distance between the metal cap and the inductor chip, this distance variation makes the variation in the resonance frequency of the RFID tag larger. Particularly, in the case that the metal cap is a cap seal used for wine etc., i.e., in the case that the metal cap is easily deformed, as in this embodiment, the Q value of the inductor chip may deteriorate and the inductance value may significantly vary in amount of change, thereby resulting in significant variations in the resonance frequency of the RFID tag. This may lead to a situation where, although communicate can favorably be performed with an RFID tag of a certain wine, communicate cannot favorably be performed (read error occurs) with an RFID tag of another wine, for example. To avoid such a situation, a magnetic shield type inductor chip restrained from performing the magnetic emission to the outside is preferably used as the inductor chip 40.

If the resonance frequency is stably maintained, an inductor chip other than the magnetic shield type is also usable.

In terms of the positional relationship between the metal cap 12 and the power feeding module 22, as shown in FIG. 8, the conductor patterns 42 to 46 on the printed wiring board 30 and the metal cap 12 are separated at a distance by the resin block 32. This suppresses the generation of the counter current (eddy current) in the metal cap 12 due to the current flowing through the conductor patterns 42, 44, 46. As a result, the electrical characteristics is prevented from varying in the conductor patterns 42 to 46 as well as the RFIC element 34, the capacitor chips 36, 38, and the inductor chip 40 due to the influence of the magnetic field generated from the metal cap 12 by the counter current. If the printed wiring board 30 has a sufficient thickness, the back surface 30b thereof can be directed toward the antenna member 20 (the base film 24) to connect the conductors 54, 52 of the printed wiring board 30 to the connection terminal parts 26b, 26c.

To stably maintain the resonance frequency of the RFID tag 18, in the case of this embodiment, the antenna member 20, i.e., the antenna pattern 26, is configured to have a small inductance.

In this embodiment, since the metal cap 12 is an easily deformable cap seal, variations in deformation of the metal cap 12 generate variations in distance between the metal cap 12 and the antenna pattern 26, so that the inductance of the antenna pattern 26 easily varies. Additionally, if the antenna pattern 26 has a large inductance, an amount of change thereof is increased. If the inductance considerably changes, the resonance frequency of the RFID tag 18 significantly deviates from the use frequency and makes communication impossible. Therefore, to reduce a width of the variation in inductance caused by deformation of the metal cap 12 and to reduce the change in the resonance frequency, the antenna pattern 26 is configured to make the inductance as small as possible.

To reduce the inductance, as shown in FIG. 3, for example, the width W1 of the loop opening 26f of the loop antenna part 26a is made as small as possible in the antenna pattern 26. Additionally, for example, a distance G1 between the wiring parts 26d, 26e extending parallel to each other is made as small as possible.

Furthermore, to stably maintain the resonance frequency of the RFID tag 18, in the case of this embodiment, the power feeding module 22 is increased in rigidity against deformation. Additionally, when the metal cap seal is attached to the wine bottle as shown in FIG. 1, a large pressure deforming the metal cap is applied to the cylindrical main body part 12a of the metal cap seal, and therefore, the power feeding module 22 is disposed on the top plate part 12b of the cylindrical main body to which a direct pressure is hardly applied.

In the case of this embodiment, the power feeding module 22 is attached to the back side of the top plate part 12b of the easily deformable metal cap 12 (cap seal). In the case of wine, the top plate part 12b of the metal cap 12 can be stamped. When stamped, the top plate part 12b is compressed together with the power feeding module 22 attached to the back side thereof. To reduce an amount of deformation due to the compression, as shown in FIG. 8, the resin block 32 of the power feeding module 22 is made of a rigid resin such as an epoxy resin, and a plurality of the metal pins 56, 60 extending in the thickness direction of the resin block 32 are further incorporated therein. As described above, the metal pins 56, 60 are interlayer connection conductors. The metal pins 56, 60 suppresses the deformation of the resin block 32, so that the deformation of the print wiring board 30 is also suppressed, and consequently, the deformation of the conductor patterns 42 to 50 formed thereon is also suppressed. Since the deformation of the conductor patterns 42 to 50 is suppressed, variations in the electrical characteristics thereof are also suppressed. As a result, the resonance frequency of the RFID tag 18 is stably maintained.

According to this embodiment as described above, even when provided inside the metal cap 12, the RFID tag 18 can communicate with a communication device outside the metal cap 12.

Although the present invention has been described with reference to the embodiment, the embodiments of the present invention are not limited thereto.

For example, in the case of the embodiment, as shown in FIGS. 4 and 10, the loop antenna part 26*a* of the antenna pattern 26 extends over substantially the entire circumference of the metal cap 12 in the circumferential direction R of the metal cap 12. Therefore, the loop opening 12*f* extends over substantially the entire circumference of the metal cap 12 in the circumferential direction R. However, the embodiments of the present invention are not limited thereto.

Figure 12:
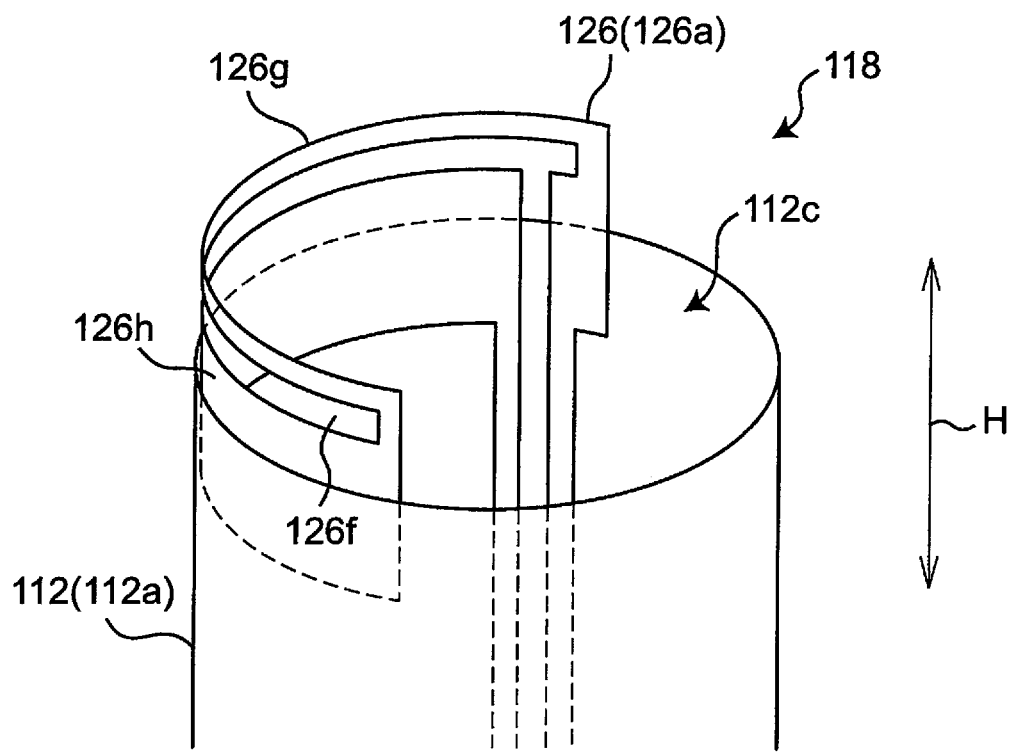
FIG. 12 is a perspective view showing a metal cap and a loop antenna part around an opening part of the metal cap according to another exemplary embodiment.
Figure 12:
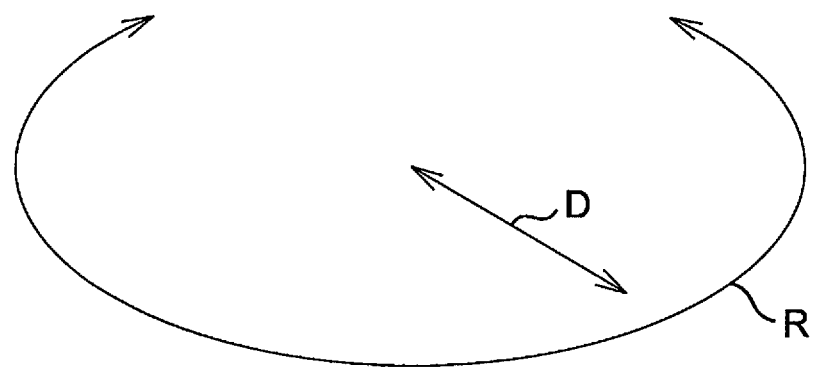

For example, FIG. 12 is a perspective view showing a circumference of an opening 112*c* of a metal cap 112 according to another embodiment, showing a portion of the metal cap 112 and a portion of an antenna pattern 126 of an antenna member of an RFID tag.

As shown in FIG. 12, a first conductor part 126*g* in a loop antenna part 126*a* of the antenna pattern 126 is not present inside a cylindrical main body part 112*a* of the metal cap 112 and is located entirety outside the metal cap 112. Additionally, the first conductor part 126*g* extends over substantially half the circumference of the metal cap 112 in the circumferential direction R of the metal cap 112.

On the other hand, a second conductor part 126*h* in the loop antenna part 126*a* of the antenna pattern 126 has a portion located outside the metal cap 112, and the remaining portion is located in the cylindrical main body part 112*a* of the metal cap 112. Additionally, the second conductor part 126*h* extends over substantially half the circumference of the metal cap 112 in the circumferential direction R of the metal cap 112.

Therefore, a loop opening 126*f* between the first conductor part 126*g* and the second conductor part 126*h* in the loop antenna part 126*a* is not present in the cylindrical main body part 112*a* of the metal cap 12 and is entirety located outside the metal cap 112. Additionally, the loop opening 126*f* extends over substantially half the circumference of the metal cap 112 in the circumferential direction R of the metal cap 112.

Figure 13:
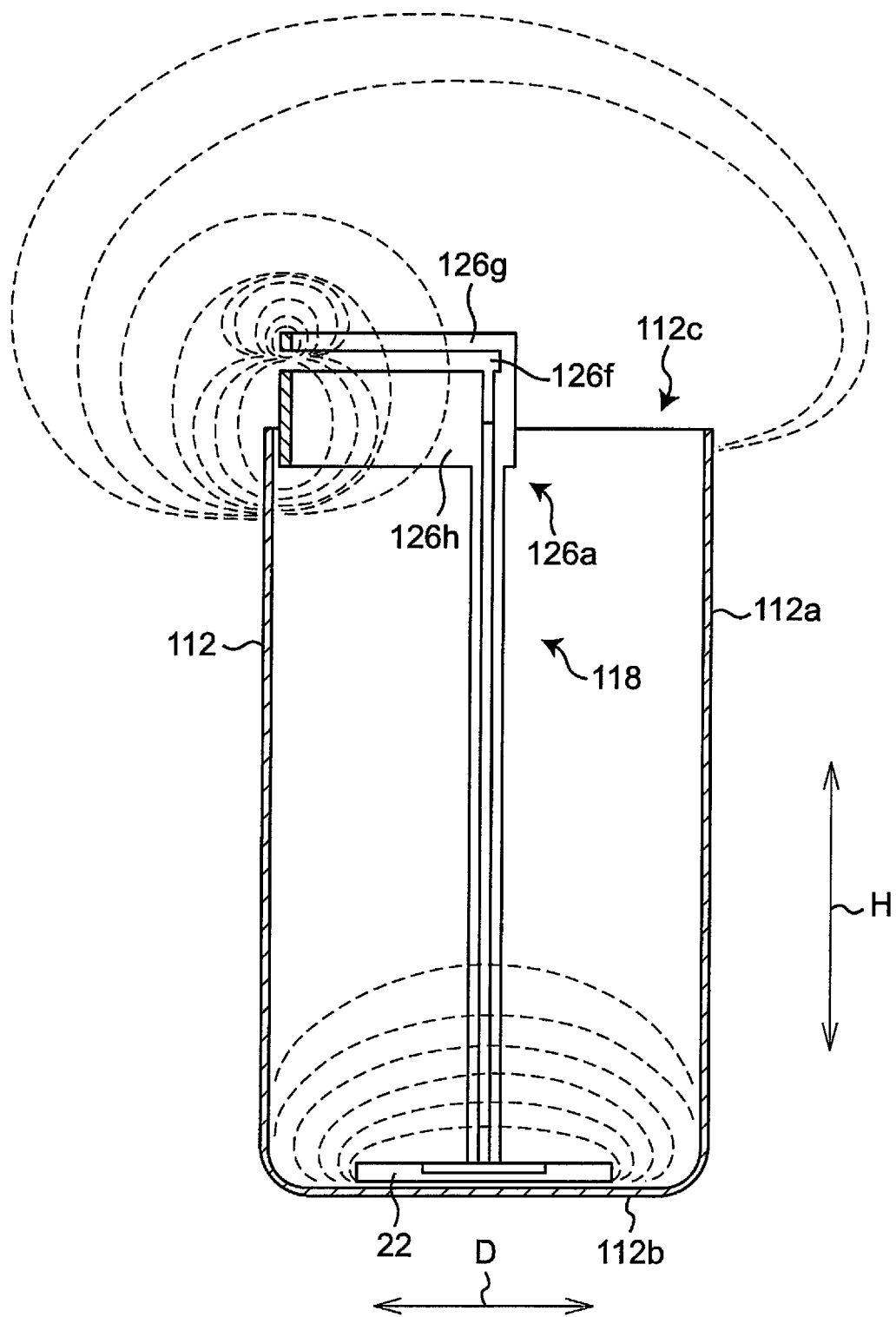
FIG. 13 is a diagram showing a magnetic field distribution generated around the loop antenna part shown in FIG. 12.

FIG. 13 shows a distribution of the magnetic field in the metal cap 112 shown in FIG. 12. Dotted lines indicate magnetic force lines.

As shown in FIG. 13, a magnetic field is formed in the first conductor part 126*g* of the loop antenna part 126*a*, generating magnetic force lines going around the first conductor part 126*g* and passing through the loop opening 126*f*.

On the other hand, unlike the first conductor part 126*g*, the second conductor part 126*h* partially overlaps with the cylindrical main body part 112*a* of the metal cap 112. Therefore, as with the embodiment described above, the metal cap 112 functions as a booster, and a magnetic field is formed in and near a portion of the cylindrical main body part 112*a* of the metal cap 112 facing the second conductor part 126*h*.

Figure 14:
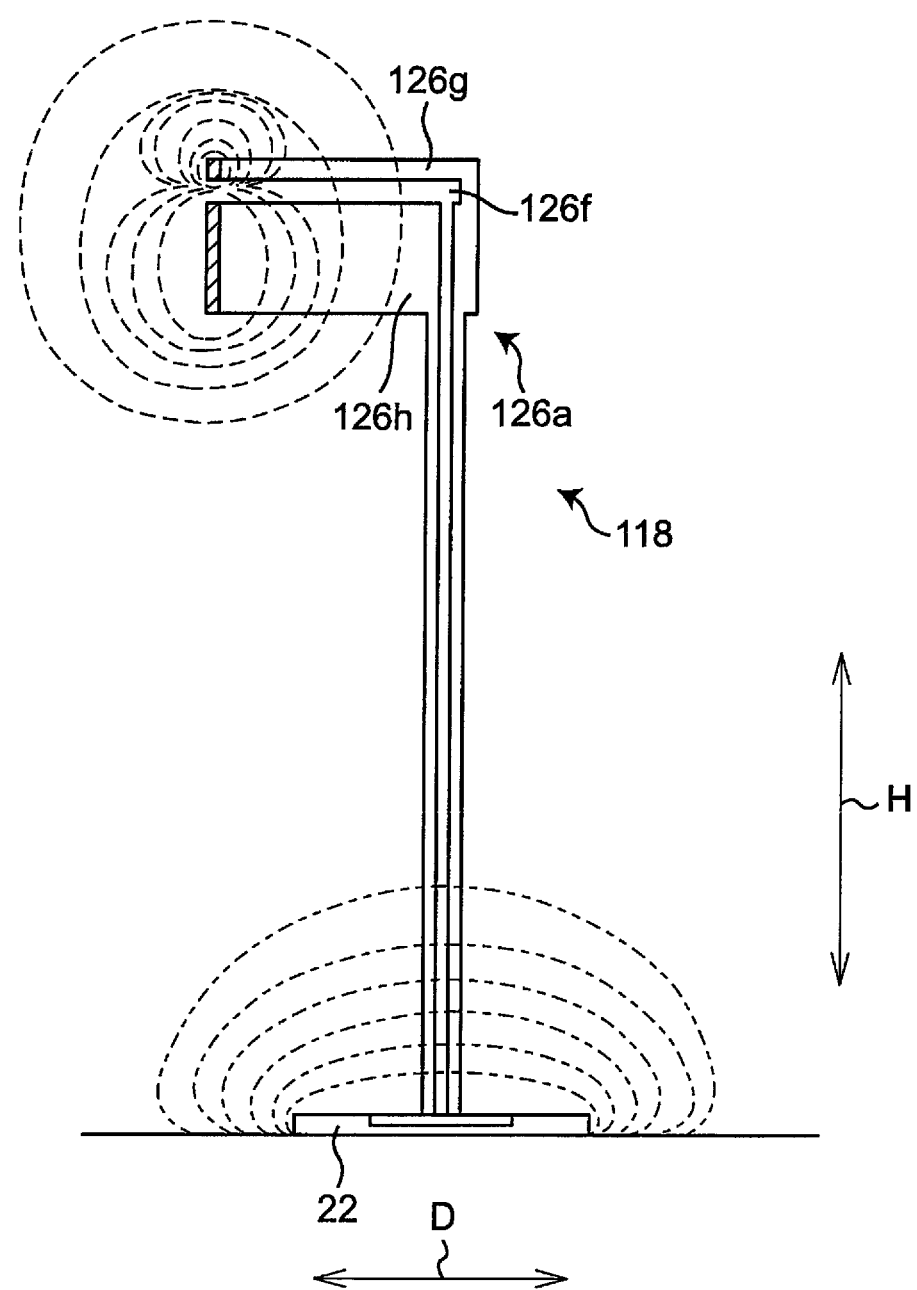
FIG. 14 is a diagram showing a magnetic field distribution generated in a loop antenna part according to a comparative example.

Since the metal cap 112 functions as a booster, as shown in FIG. 13, the magnetic field is formed, reaching the side opposite to the loop antenna part 126*a* in the radial direction D. For reference, when the metal cap 112 does not exist, as shown in FIG. 14 showing a comparative example, no magnetic field is formed on the side opposite to the loop antenna part 126*a* in the radial direction D. This is because, as shown in FIG. 13, a current flows through the cylindrical main body part 112*a* of the metal cap 112 due to capacitive coupling with the second conductor part 126*h*, and the current flows along an edge of the opening part 112*c* to a portion of the cylindrical main body part 112*a* not facing the loop antenna part 126*a*. As a result, although the intensity varies depending on a direction, the magnetic field spreads in every radial direction D of the metal cap 112 and spreads in the height direction H to reach a portion of the cylindrical main body part 112*a* of the metal cap 112. As a result, the RFID tag 118 in this case can perform communication with an external communication device in substantially the same way as the RFID awning 18 having the loop antenna part 26*a* extending over substantially the entire circumference of the metal cap 12 as shown in FIG. 10.

For example, for the embodiment shown in FIG. 10, a portion of the second conductor part 26*h* of the loop antenna part 26*a* is overlapped with and capacitively coupled to the cylindrical main body part 12*a* of the metal cap 12 so that the metal cap 12 functions as a booster enhancing the magnetic field. However, the exemplary embodiments of the present invention are not limited thereto.

Specifically, it is difficult to allow the metal cap to function as a booster in some cases. For example, when the metal cap is thick, the metal cap has high electric resistance, or the current flowing through the loop antenna part is low, it is difficult to allow the metal cap to function as a booster. If the metal cap cannot function as a booster, the metal cap functions as a magnetic shield and shields the magnetic field generated from the loop antenna part 26*a*. As a result, the RFID tag can communicate only at a short communication distance.

Figure 15:
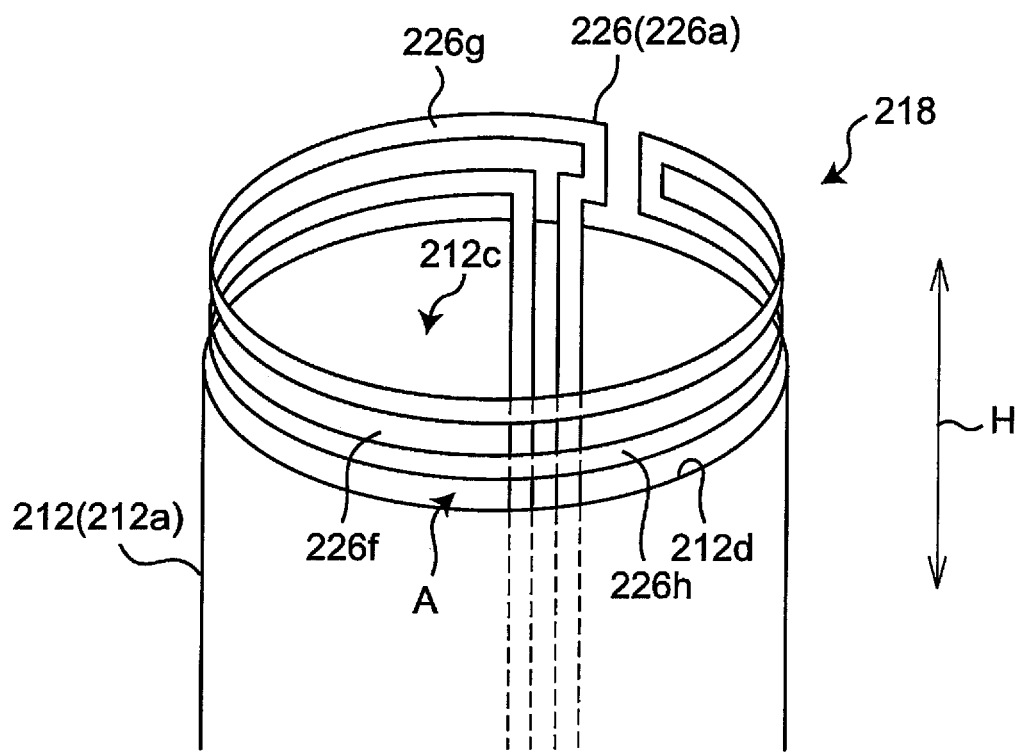
FIG. 15 is a perspective view showing a metal cap and a loop antenna part around an opening part of the metal cap according to yet another embodiment.
Figure 15:
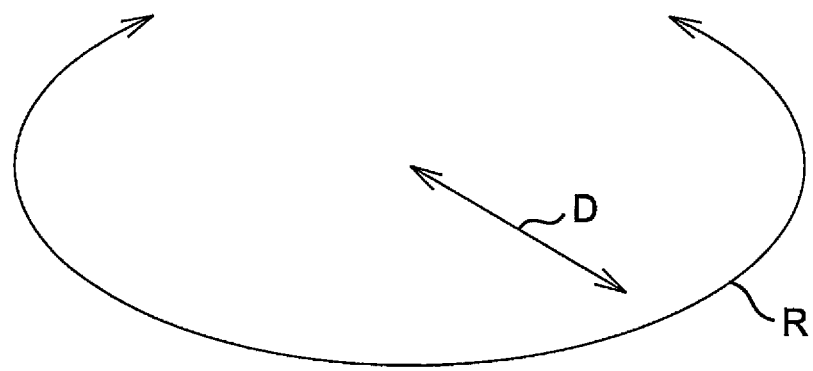

FIG. 15 is a perspective view showing a circumference of an opening part 212*c* of a metal cap 212 according to yet another embodiment capable of dealing with the problem, showing a portion of the metal cap 212 and a portion of an antenna pattern 226 of an antenna member of an RFID tag 218.

As shown in FIG. 15, a first conductor part 226*g* in a loop antenna part 226*a* of the antenna pattern 226 is not present inside a cylindrical main body part 212*a* of the metal cap 212 and is located entirety outside the metal cap 212. Additionally, the first conductor part 226*g* extends over substantially the entire circumference of the metal cap 212 in the circumferential direction R of the metal cap 212.

Similarly, a second conductor part 226*h* in the loop antenna part 226*a* of the antenna pattern 226 is not present inside the cylindrical main body part 212*a* of the metal cap 212 and is located entirety outside the metal cap 212. Additionally, the second conductor part 226*h* extends over substantially the entire circumference of the metal cap 212 in the circumferential direction R of the metal cap 212.

Particularly, the second conductor part 226*h* extends away from an opening edge 212*d* of the opening part 212*c* of the metal cap 212 in the height direction H and thereby forms a gap A from the cylindrical main body part 222*a* of the metal cap 212.

Figure 16:
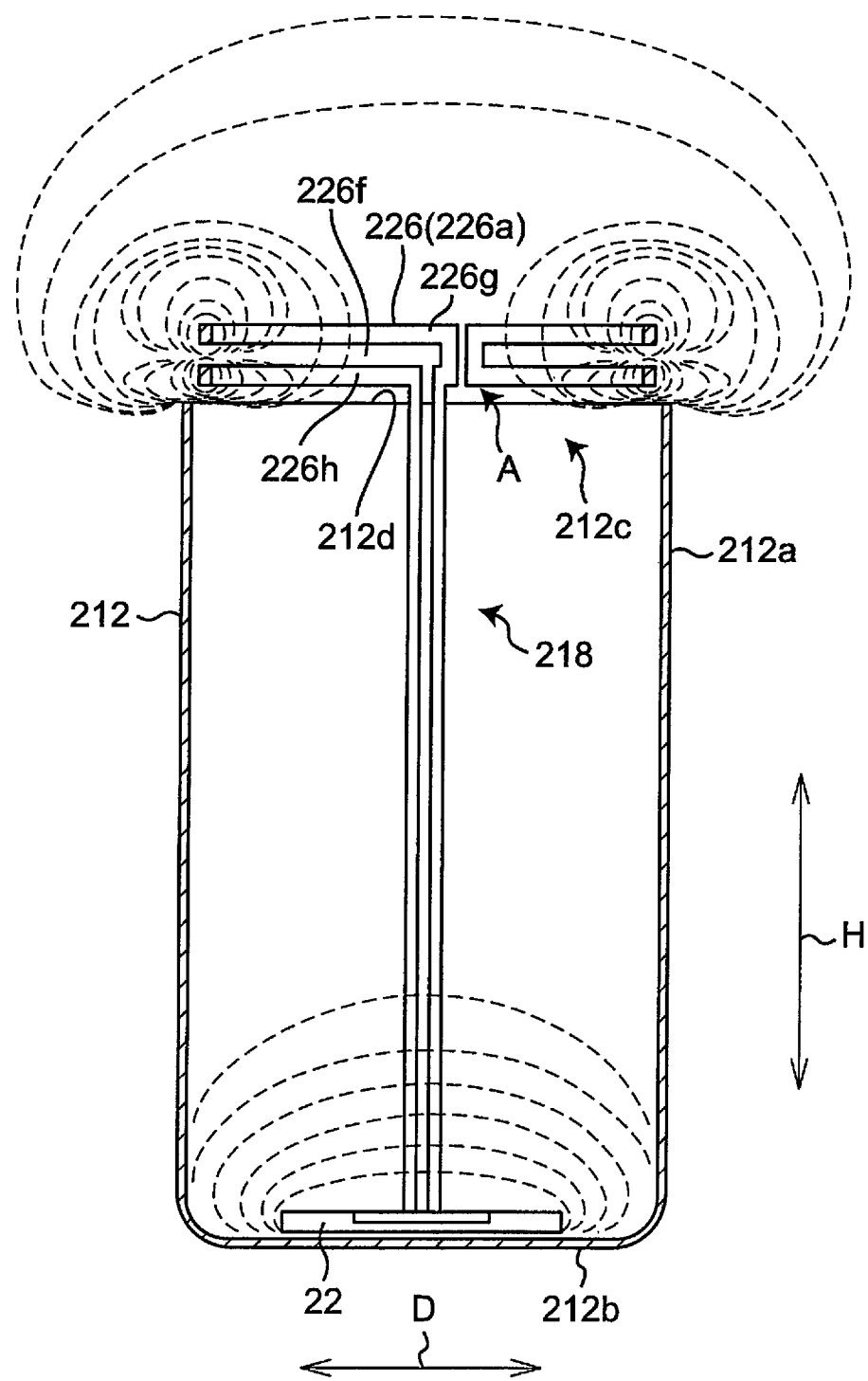
FIG. 16 is a diagram showing a magnetic field distribution generated around the loop antenna part shown in FIG. 15.

FIG. 16 shows a distribution of the magnetic field in the metal cap 212 shown in FIG. 15. Dotted lines indicate magnetic force lines.

As shown in FIG. 16, a magnetic field is formed in the first conductor part 226*g* of the loop antenna part 226*a*, generating magnetic force lines going around the first conductor part 226*g* and passing through the loop opening 226*f*.

On the other hand, a magnetic field is formed in the second conductor part 226*h*, going around the second conductor part 226*h* and passing through the loop opening part 226*f* and the gap A.

As a result, although not spreading in the height direction H to reach a portion of the cylindrical main body part 212a of the metal cap 212, the magnetic field spreads in every radial direction D of the metal cap 212. As a result, the RFID tag 218 in this case can communicate with an external communication device in substantially the same way as the RFID tag 18 having the second conductor part 26h of the loop antenna part 26a partially overlapping with the cylindrical main body part 12a of the metal cap 12 as shown in FIG. 10.

In this way, even when the second conductor part of the loop antenna part partially overlaps with the cylindrical main body part of the metal cap or is entirely located at a position outside the metal cap, the RFID tag can perform communication. Similarly, even when the second conductor part of the loop antenna part entirely overlaps with the cylindrical main body part of the metal cap, the RFID tag can perform communication. Therefore, the loop antenna part has any shape as long as at least a portion of the loop opening is located outside the metal cap.

However, the loop opening of the loop antenna part preferably extends in the circumferential direction of the metal cap. If the loop opening extends in the height direction of the metal cap, the metal cap including the RFID tag increases in size in the height direction as a whole and may deteriorate the design of the entire container including the metal cap. Moreover, if the loop opening extends in the height direction, the possibility of breaking of the loop antenna increases as compared to when the loop opening extends in the circumferential direction.

In the exemplary embodiment, for example, as with the loop opening 26f shown in FIG. 3, the shape of the loop opening is a rectangular shape extending in the circumferential direction R of the metal cap on the outside of the metal cap 121; however, the present invention is not limited thereto. Therefore, the entire loop opening has any shape as long as a portion of the loop opening exposed from the metal cap extends in the circumferential direction.

Furthermore, for example, in the case of the embodiment, as shown in FIG. 10, the antenna pattern 26 has the one loop antenna part 26a; however, the embodiments of the present invention are not limited thereto.

Figure 17:
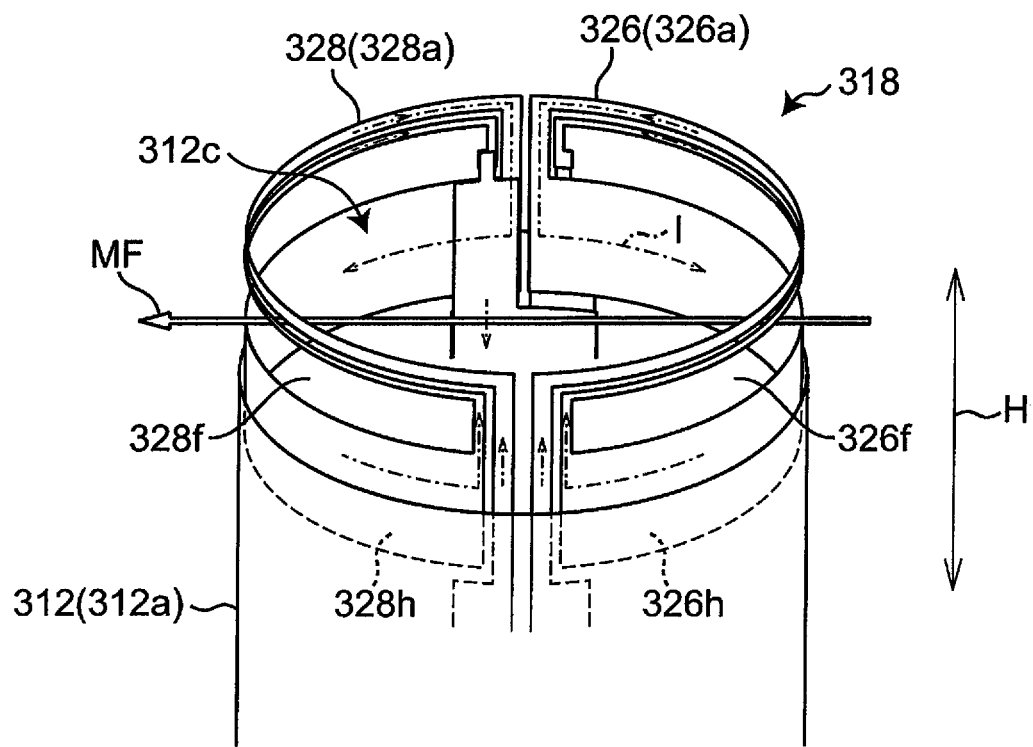
FIG. 17 is a perspective view showing a metal cap and a loop antenna part around an opening part of the metal cap according to a further embodiment.
Figure 17:
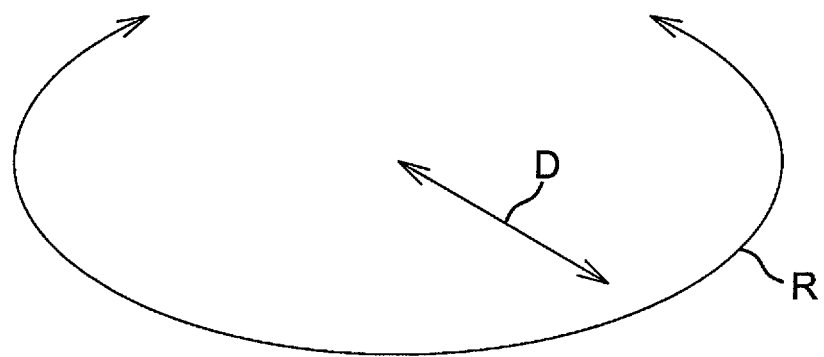
Figure 18:
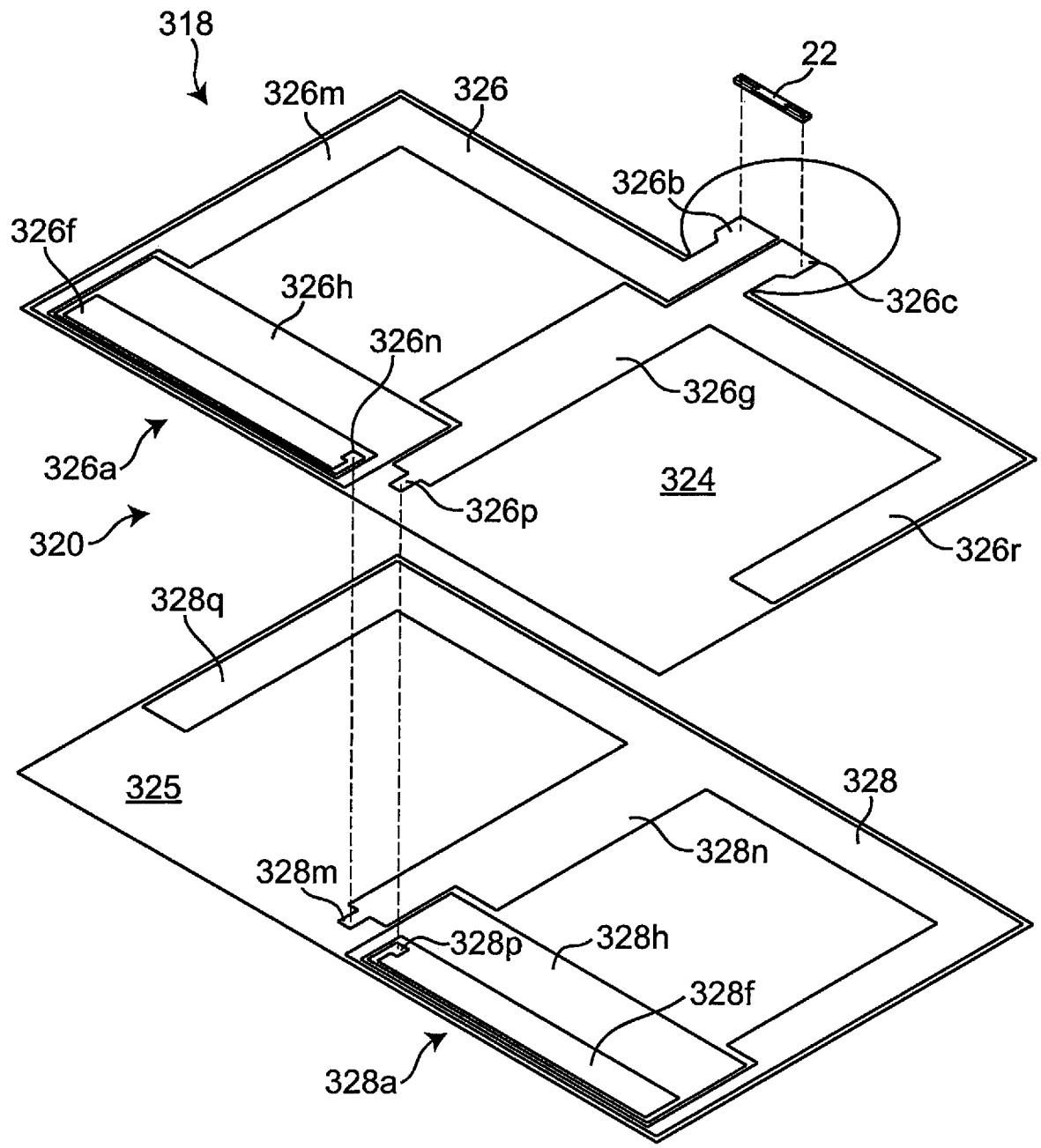
FIG. 18 is an exploded view of the RFID tag including the loop antenna part shown in FIG. 17.

For example, FIG. 17 is a perspective view showing a circumference of an opening part 312c of a metal cap 312 according to a further embodiment, showing a portion of the metal cap 312 and a portion of an antenna pattern of an antenna member of an RFID tag 318. FIG. 18 shows an exploded view of the RFID tag 318.

As shown in FIG. 18, the RFID tag 318 includes first and second antenna patterns 326, 328 as two different antenna patterns. The first antenna pattern 326 is provided with a first loop antenna part 326a. The second antenna pattern 328 is provided with a second loop antenna part 328a. In this case, the first loop antenna part 326a and the second loop antenna part 328a are two-turn loop antennas.

As shown in FIG. 17, the first loop antenna part 326a and the second loop antenna part 328a are arranged such that respective loop openings 326f, 328f face each other. Additionally, the first loop antenna part 326a and the second loop antenna part 328a are connected in series so that a current flows in the same direction as viewed in the facing direction of the loop openings 326f, 328f. A structure of the RFID tag 318 implementing this positional relationship between the first loop antenna part 326a and the second loop antenna part 328a will be described with reference to FIG. 18.

As shown in FIG. 18, the first antenna pattern 326 is formed on a first base film 324 made of an insulating material. The second antenna pattern 328 is formed on a second base film 325 different from the first base film 324. An antenna member 320 is formed by laminating the first base film 324 on which the first antenna pattern 326 is formed and the second base film 325 on which the second antenna pattern 328 is formed.

The first antenna pattern 326 includes connection terminal parts 326b, 326c for connecting to the power feeding module 22. The first antenna pattern 326 also includes a wiring part 326m connecting the connection terminal part 326b and one end of the first loop antenna part 326a.

The other end 326n of the first loop antenna part 326a of the first antenna pattern 326 is connected to a connection terminal part 328m of the second antenna pattern 328. Specifically, the other end 326n of the first loop antenna part 326a and the connection terminal part 328m of the second antenna pattern 328 are connected by an interlayer connection conductor such as a via-hole conductor and a through-hole conductor penetrating the first base film 324.

The second antenna pattern 328 includes a wiring part 328n connecting the connection terminal part 328m and one end of the second loop antenna part 328a.

The other end 328p of the second loop antenna part 328a of the second antenna pattern 328 is connected to a connection terminal part 326p of the first antenna pattern 326. Specifically, the other end 328p of the second loop antenna part 328a and the connection terminal part 326p of the first antenna pattern 326 are connected by an interlayer connection conductor such as a via-hole conductor and a through-hole conductor penetrating the first base film 324.

The connection terminal part 326p of the first antenna pattern 326 is connected to the connection terminal part 326c by a wiring part 326q.

According to the RFID tag 318 (the antenna member 320), as shown in FIGS. 17 and 18, a current I flowing from the power feeding module 22 to the connection terminal part 326b of the first antenna pattern 326 goes through the wiring part 326m to the first loop antenna part 326a. The current I passing through the first loop antenna part 326a goes from the other end 326n through the interlayer connection conductor to the connection terminal part 328m of the second antenna pattern 328. The current I flowing into the second antenna pattern 328 goes through the wiring part 328n to the second loop antenna part 328a. The current I passing through the second loop antenna part 328a goes from the other end 328p through the interlayer connection conductor to the connection terminal part 326p of the first antenna pattern 326. The current I flowing into the first antenna pattern 326 then flows through the wiring part 326q and the connection terminal part 326c into the power feeding module 22.

According to the flow of the current I as described above, as shown in FIG. 17, the current I flows in the same direction through the first loop antenna part 326a and the second loop antenna part 328a as viewed in the facing direction of the loop openings 326f, 328f. As a result, a magnetic force line MF passing through both the loop openings 326f, 328f in the same direction is generated.

Figure 19:
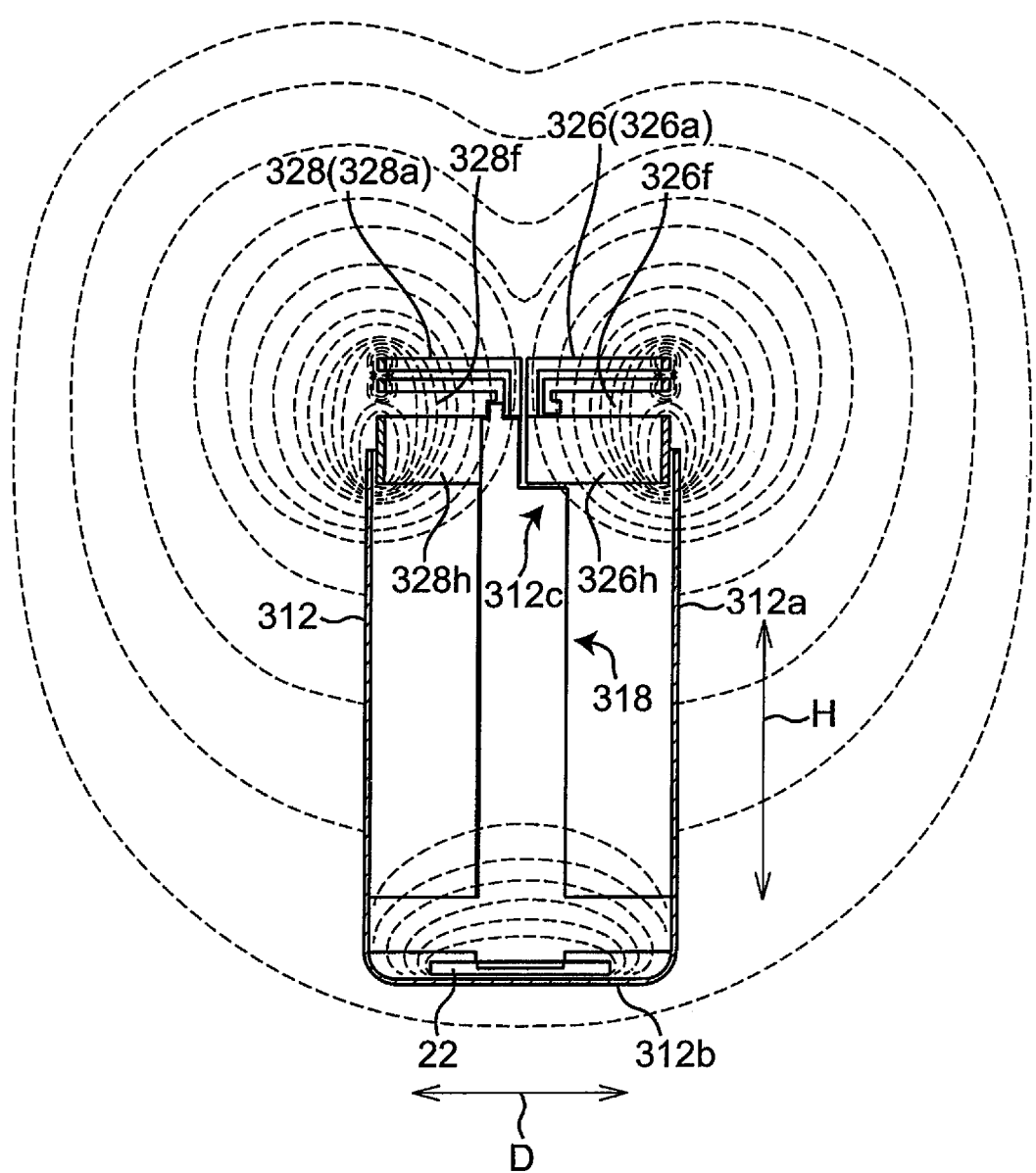
FIG. 19 is a diagram showing a magnetic field distribution generated around the loop antenna part shown in FIG. 17.

FIG. 19 shows a distribution of the magnetic field in the metal cap 312 shown in FIG. 17. Dotted lines indicate magnetic force lines.

Due to the generation of the magnetic force line MF passing through both the loop opening 326f of the first loop antenna part 326a and the loop opening 328f of the second loop antenna part 328a in the same direction as shown in FIG. 17, a strong magnetic field (a magnetic field having a high magnetic flux density) is formed around the first loop antenna part 326a and the second loop antenna part 328a as shown in FIG. 19. As a result, the metal cap capacitively coupled to the first loop antenna part 326a and the second loop antenna part 328a more strongly functions as a booster. Consequently, the distribution of the magnetic field expands in the height direction H of the metal cap 312 and reaches a top plate part 312b. In the case of this embodiment, as the loop openings 326f, 328f more increase in the size in the height direction, the magnetic field further expands in the height direction. This enables the RFID tag 318 to have a wider communicable range. The first and second loop antenna parts 326a, 328a are two-turn loop antennas in the case of this embodiment, and when the number of turns is smaller, the magnetic field further expands in the height direction.

As shown in FIG. 18, the first antenna pattern 326 has a portion 326r not contributing to generation of a magnetic field, and the second antenna pattern 328 has a similar portion 328q. The portion 326r of the first antenna pattern 326 overlaps with the wiring part 328n of the second antenna pattern 328 and thereby functions as a reinforcing part reinforcing the wiring part 328n. Similarly, the portion 328q of the second antenna pattern 328 overlaps with the wiring part 326m of the first antenna pattern 326 and thereby functions as a reinforcing part reinforcing the wiring part 326m. As a result, when the metal cap 312 is deformed along the external shape of the neck part 10a of the container 10 as described above, breaking is suppressed between the wiring part 326m of the first antenna pattern 326 and the wiring part 328n of the second antenna pattern 328.

The principle of formation of the magnetic field widely expanded by the first loop antenna part 326a and the second loop antenna part 328a can briefly be described as follows.

In principle, the combination of the first loop antenna part 326a and the second loop antenna part a corresponds to an antenna acquired by forming a figure of "eight" to form two loops from one loop antenna and then folding the loop antenna having a figure of "eight" in half such that the two loops overlap each other. According to such a double-folded loop antenna having a figure of "eight", the density of magnetic fluxes passing through the overlapping two loop openings is substantially doubled as compared to the density of magnetic fluxes passing through the original one loop opening. As a result, as compared to the original loop antenna, the double-folded loop antenna having a figure of "eight" can form a greatly expanded magnetic field.

Additionally, in the case of the embodiment, for example, as shown in FIG. 2, the power feeding module 22 (i.e., the RFIC element 34) of the RFID tag 18 is disposed on the back side of the top plate part 12b of the metal cap 12. However, the metal cap according to the embodiments of the present invention is not limited thereto. For example, the RFIC element can be disposed on the back side of the cylindrical main body part of the metal cap.

Specifically, in a broad sense, the metal cap according to the exemplary embodiments of the present invention has a metal cap including a cylindrical main body part, a top plate part formed at one end of the cylindrical main body part, and an opening part formed at the other end of the cylindrical main body part, and an RFID tag disposed on the metal cap; the RFID tag includes an RFIC element disposed in the metal cap and a loop antenna partially disposed in the metal cap and connected to the RFIC element; and at least a portion of a loop opening of the loop antenna extends in a circumferential direction of the metal cap while being exposed from an opening edge of the opening part of the metal cap to the outside of the metal cap.

If the metal cap is a cap seal torn and opened before use as in the case of wine as in the embodiment, a tearing tab may be disposed on a base film of the RFID tag. As a result, by pulling the tearing tab toward the opening of the container, the cap seal is torn and opened by an edge of the base film lifted by the pulling.

Regarding the base film, in the case of the embodiment, as shown in FIG. 4, the base film has a size and a shape affixed to a portion of the metal sheet 16; however, the base film may have a size and a shape affixed to substantially the entire metal sheet 16. This prevents a boundary from appearing as a step on the outside surface of the metal cap 12 between portions with and without the base film 24 affixed thereto. As a result, a deterioration of the design of the metal cap 12 is prevented.

Furthermore, regarding the base film, the base film itself can be eliminated. For example, when the metal cap is plastic-coated as in the embodiment, the antenna pattern of the RFID tag can be formed on the coating layer.

Additionally, for example, in the case of the embodiment, the metal cap is an easily deformable cap seal used for wine, for example However, the exemplary embodiments of the present invention are not limited thereto. For example, the metal cap may be a screw cap used for wine etc. Furthermore, the container is not limited to a wine bottle and may be any container comprising an opening covered with a metal cap, including an expensive alcoholic beverage bottle such as a whiskey bottle.

If the metal cap is a screw cap, preferably, the RFID tag is subjected to a waterproof treatment so that the RFID tag disposed on the inside of the metal cap (e.g., the back side of the top plate part) will not get wet with the contents of the container. For example, the power feeding module and the antenna pattern may be sandwiched between two plastic sheets to form the RFID tag.

Additionally, the RFID tag according to the exemplary embodiments of the present invention is not limited to the configuration transmitting/receiving signals of a frequency in the HF band and may be configured to transmit/receive signals of frequencies in various bands. The RFID tag disposed in the metal cap according to the embodiments of the present invention may be configured to transmit/receive signals of a frequency in the UHF band, for example.

Although the present invention has been described with a plurality of embodiments, it is apparent for those skilled in the art that at least one embodiment can entirely or partially be combined with a certain embodiment to form a further embodiment according to the present invention.

The present invention is applicable to any metal cap on which an RFID tag needs to be disposed regardless of reason.

EXPLANATIONS OF LETTERS OR NUMERALS 10 container
12 metal cap
12a cylindrical main body part
12b top plate part
12c opening part
12d opening edge
18 RFID tag
26a loop antenna (loop antenna part)
26f loop opening
RFIC element
R circumferential direction

The invention claimed is:

1. A metal cap with an RFID tag comprising:
   a metal cap including a cylindrical main body, a top plate disposed at a first end of the cylindrical main body, and an opening at a second end of the cylindrical main body that is opposite the first end; and
   an RFID tag disposed on the metal cap and including:
   an RFIC element disposed in the metal cap, and
   a loop antenna connected to the RFIC element, with the loop antenna having a loop opening with at least a portion thereof extending in a circumferential direction of the metal cap and being exposed from an opening edge of the opening of the metal cap.

2. The metal cap with an RFID tag according to claim 1, wherein the top plate of the metal cap covers an opening of a container when the metal cap is secured to the container.

3. The metal cap according to claim 2, wherein the container is a wine bottle, and the metal cap is a cap seal.

4. The metal cap according to claim 2, wherein the loop antenna extends in a direction away from the RFIC element when the metal cap is secured to the container, such that the loop opening extends around at least a portion of the circumferential direction of the container to expose the loop opening configuring the loop opening to communicate data signals with an external communication device.

5. The metal cap with an RFID tag according to claim 1, wherein the loop antenna includes a first conductor extending in the circumferential direction and that is entirely located outside the metal cap.

6. The metal cap with an RFID tag according to claim 5, wherein the loop antenna includes a second conductor extending in the circumferential direction to face the first conductor across the loop opening.

7. The metal cap with an RFID tag according to claim 6, wherein the second conductor of the loop antenna at least partially overlaps the cylindrical main body of the metal cap.

8. The metal cap with an RFID tag according to claim 7, wherein the second conductor has a larger width than a width of the first conductor.

9. The metal cap with an RFID tag according to claim 1, wherein the loop antenna comprises a first loop antenna that includes a first loop opening and a second loop antenna including a second loop opening that faces the first loop opening.

10. The metal cap with an RFID tag according to claim 9, wherein the first loop antenna and the second loop antenna are connected in series, such that a current flows in a same direction as viewed in a facing direction of the first and second loop openings.

11. The metal cap with an RFID tag according to claim 1, wherein the RFIC element and the loop antenna are connected via a magnetic shield type inductor chip that includes an inductor covered with a magnetic material.

12. A container including an opening, comprising:
   a metal cap that includes a cylindrical main body, a top plate disposed at a first end of the cylindrical main body, and an opening at a second end of the cylindrical main body that is opposite the first end, with the metal cap configured to cover the opening of the container when secured to the container; and
   an RFID tag disposed on the metal cap and including:
   an RFIC element disposed in the metal cap, and
   a loop antenna connected to the RFIC element, with the loop antenna having a loop opening with at least a portion thereof that extends in a circumferential direction of the metal cap and is exposed from an opening edge of the opening of the metal cap to an outside of the metal cap when the metal cap is secured to the container.

13. The container according to claim 12, wherein the container is a wine bottle, and the metal cap is a cap seal.

14. The metal cap according to claim 12, wherein the loop antenna extends in a direction away from the RFIC element, such that the loop opening extends around at least a portion of the circumferential direction of the container to expose the loop opening configuring the loop opening to communicate data signals with an external communication device.

15. The metal cap with an RFID tag according to claim 12, wherein the loop antenna includes a first conductor extending in the circumferential direction and that is entirely located outside the metal cap, and further includes a second conductor extending in the circumferential direction to face the first conductor across the loop opening.

16. The metal cap with an RFID tag according to claim 15, wherein the second conductor of the loop antenna at least partially overlaps the cylindrical main body of the metal cap.

17. The metal cap with an RFID tag according to claim 16, wherein the second conductor has a larger width than a width of the first conductor.

18. The metal cap with an RFID tag according to claim 12, wherein the loop antenna comprises a first loop antenna that includes a first loop opening and a second loop antenna including a second loop opening that faces the first loop opening.

19. The metal cap with an RFID tag according to claim 18, wherein the first loop antenna and the second loop antenna are connected in series, such that a current flows in a same direction as viewed in a facing direction of the first and second loop openings.

20. The metal cap with an RFID tag according to claim 12, wherein the RFIC element and the loop antenna are connected via a magnetic shield type inductor chip that includes an inductor covered with a magnetic material.

* * * * *